US012351262B2

(12) United States Patent
Chang et al.

(10) Patent No.: US 12,351,262 B2
(45) Date of Patent: Jul. 8, 2025

(54) MICROMOBILITY TRANSIT VEHICLE CABLE LOCK ASSEMBLY SYSTEMS AND METHODS

(71) Applicant: Lyft, Inc., San Francisco, CA (US)

(72) Inventors: Calvin Jye Chang, Oakland, CA (US); Merric-Andrew Jaranowski French, San Francisco, CA (US); Kevin Shia, San Francisco, CA (US); Xin Wu, Foster City, CA (US)

(73) Assignee: Lyft, Inc., San Francisco, CA (US)

( * ) Notice: Subject to any disclaimer, the term of this patent is extended or adjusted under 35 U.S.C. 154(b) by 1019 days.

(21) Appl. No.: 17/135,027

(22) Filed: Dec. 28, 2020

(65) Prior Publication Data

US 2022/0204102 A1 Jun. 30, 2022

(51) Int. Cl.
 *B62H 5/00* (2006.01)
 *B62H 5/14* (2006.01)
 (Continued)

(52) U.S. Cl.
 CPC ............ *B62H 5/003* (2013.01); *B62H 5/141* (2013.01); *E05B 47/0012* (2013.01);
 (Continued)

(58) Field of Classification Search
 CPC .......... B62H 5/003; B62H 5/141; B62H 3/00; E05B 47/0012; E05B 73/00; E05B 2047/0069
 See application file for complete search history.

(56) References Cited

U.S. PATENT DOCUMENTS

| 2,406,257 A * | 8/1946 | Romero ................. B62H 5/142 70/227 |
| 2005/0144991 A1 * | 7/2005 | Bravo ................... E05B 13/002 70/56 |

(Continued)

FOREIGN PATENT DOCUMENTS

| EP | 2082950 A1 | 7/2009 |
| JP | 2010235075 A | 10/2010 |
| WO | WO 2020214847 A1 | 10/2020 |

OTHER PUBLICATIONS

International Search Report and Written Opinion for International Application No. PCT/US2021/064302, 11 pages, Apr. 21, 2022.

*Primary Examiner* — Michael P Ferguson
*Assistant Examiner* — Thomas L Neubauer
(74) *Attorney, Agent, or Firm* — Baker Botts L.L.P.

(57) ABSTRACT

Techniques are disclosed for systems and methods associated with a cable lock assembly for a micromobility transit vehicle. A lock assembly may include a latch, an actuator, and an electric motor. The latch may be movable between a first, locking configuration securing a locking pin in place and a second, unlocking configuration disengaging the latch from the locking pin. The actuator may be coupled to the latch and movable between a plurality of positions, such as first, second, and third positions. The first position may secure the latch in the first configuration. The second position may move the latch to the second configuration. The third position may allow the latch to move between the first configuration and the second configuration. The electric motor may move the actuator between positions. A tolerance between the actuator and the latch may limit a load applied to the actuator by the latch.

20 Claims, 24 Drawing Sheets

(51) Int. Cl.
 E05B 47/00 (2006.01)
 E05B 73/00 (2006.01)
 B62H 3/00 (2006.01)
(52) U.S. Cl.
 CPC ............... E05B 73/00 (2013.01); *B62H 3/00* (2013.01); *E05B 2047/0069* (2013.01)

(56) References Cited

U.S. PATENT DOCUMENTS

| | | | |
|---|---|---|---|
| 2007/0101779 A1 | 5/2007 | Muerza | |
| 2009/0031766 A1* | 2/2009 | Stobbe | B62H 5/003 70/263 |
| 2018/0298636 A1* | 10/2018 | Minnich | E05B 77/34 |
| 2020/0331549 A1* | 10/2020 | Leudtke | B62H 5/145 |
| 2020/0332565 A1 | 10/2020 | Luedtke | |

* cited by examiner

MICROMOBILITY TRANSIT VEHICLE CABLE LOCK ASSEMBLY SYSTEMS AND METHODS

TECHNICAL FIELD

One or more embodiments of the present disclosure relate generally to micromobility transit vehicles and more particularly, for example, to systems and methods associated with a cable lock assembly for a micromobility transit vehicle.

BACKGROUND

Existing locks for micromobility vehicles for hire (e.g., shared scooters, sit-scooters, bicycles, etc.) can be difficult to lock and/or unlock. Movement of existing locks from a locked state to an unlocked state, or vice versa, may be inefficient, unreliable, or non-repeatable. Existing locks may also be easily tampered with, such as unlocked through impact with enough inertial effect to move a locking latch. Therefore, there is a need in the art for a lock configuration that addresses the deficiencies noted above, other deficiencies known in the industry, or at least offers an alternative to current techniques.

SUMMARY

Techniques are disclosed for systems and methods associated with a cable lock assembly for a micromobility transit vehicle. In accordance with one or more embodiments, a lock assembly is provided. The lock assembly may include a locking pin; a latch movable between a first configuration and a second configuration; an actuator coupled to the latch and movable between a first position, a second position, and a third position; and an electric motor operable to move the actuator between positions. The first configuration engaging the latch with the locking pin to secure the locking pin in place. The second configuration disengaging the latch from the locking pin. The first position may secure the latch in the first configuration. The second position may move the latch to the second configuration. The third position may allow the latch to move between the first configuration and the second configuration. A tolerance between the actuator and the latch may limit a load applied to the actuator by the latch.

One or more embodiments provide a micromobility transit vehicle. The micromobility transit vehicle may include a frame, a cable including an end coupled to the frame and a locking pin, and a lock configured to secure the locking pin of the cable. The lock may include a lock cylinder configured to receive the locking pin of the cable, a latch movable between a locking configuration and an unlocking configuration, an actuator coupled to the latch and movable between a plurality of positions to move the latch between the locking configuration and the unlocking configuration, and an electric motor operable to move the actuator between positions. The locking configuration may engage the latch with the locking pin to secure the locking pin in place. The unlocking configuration may disengage the latch from the locking pin. A tolerance between the actuator and the latch may limit a load applied to the actuator by the latch as the locking pin is pulled or pushed against the latch.

One or more embodiments provide a method of changing a configuration of a lock assembly including a latch, an actuator coupled to the latch, and an electric motor operable to move the actuator between positions. The method may include pushing, via the actuator, the latch towards a lock cylinder to secure the latch in a locking configuration. The method may include pulling, via the actuator, the latch away from the lock cylinder to move the latch to an unlocking configuration.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, a cable lock assembly is provided. Sensors are provided to detect a position of a locking pin when the locking pin is maintained in a holster and/or as it is inserted into the lock assembly. The holster sensor may detect that the locking pin remains securely engaged during vehicle operation and is not at risk of becoming entangled with wheels or spokes of the vehicle. Additional sensors are provided to detect the position of a lock actuator and related mechanical features so that the current state of the lock assembly can be accurately monitored.

The lock assembly may include an electric motor that drives a threaded actuator through a leadscrew. The actuator may push against a latch that engages with the locking pin. The actuator may pull the latch away from the locking pin to unlock the lock assembly.

The lock assembly may provide tamper protection due to mechanical implementation and tolerances. For example, a force applied to the locking pin may pull or push against the latch, but may not introduce load on the actuator, leadscrew, or electric motor due to a tolerance between the latch and the actuator. In this regard, the latch may be positioned in a guide with tighter tolerances than those between the latch and the actuator. As the latch is pulled upward, the latch will exert pressure against the guide due to the tight tolerances at the latch/guide interface but will not exert force on the actuator due to the larger tolerances at the latch/actuator interface. Thus, the actuator, leadscrew, and/or electric motor may be effectively decoupled from the latch and locking pin, such that the actuator, leadscrew, and/or electric motor will not be damaged by the tampering.

Figure 1:
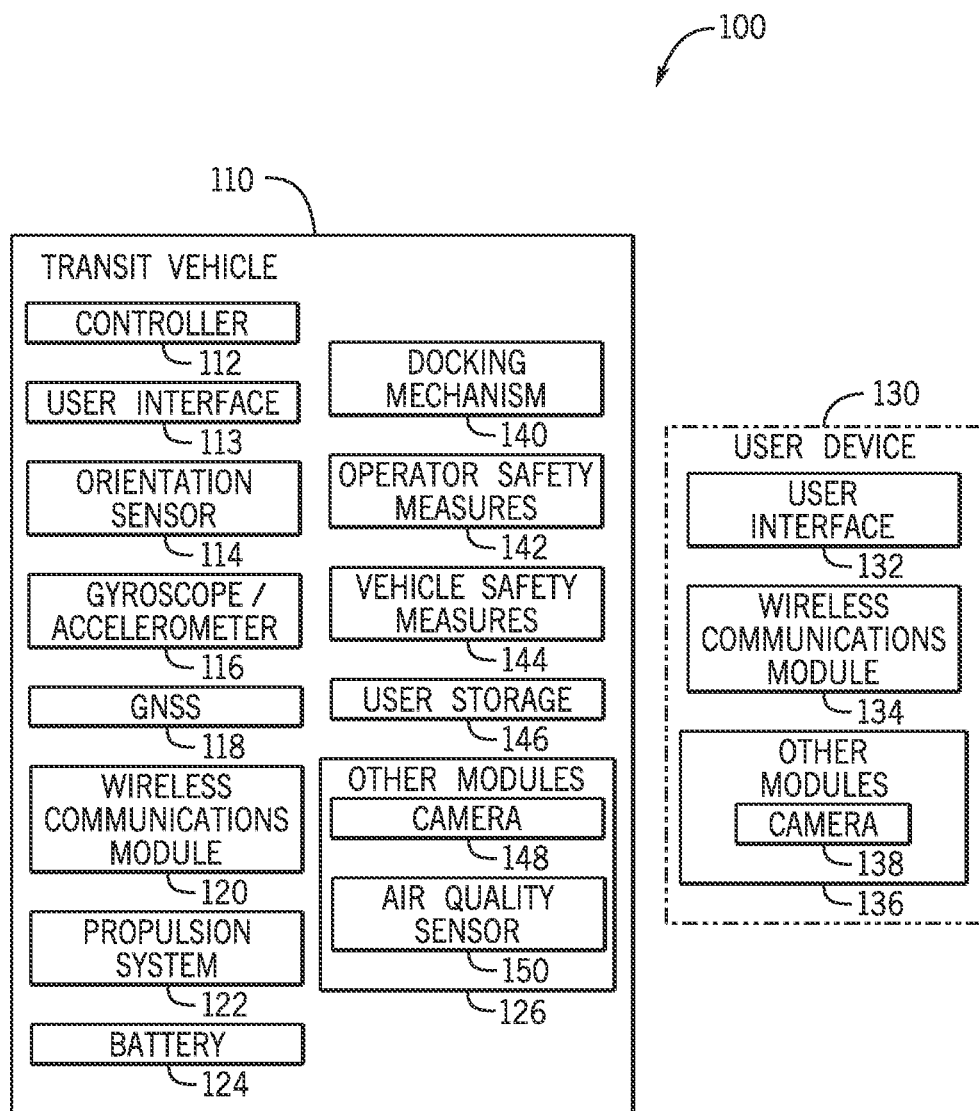
FIG. 1 illustrates a block diagram of a portion of a dynamic transportation matching system including a transit vehicle, in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/ servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radiofrequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
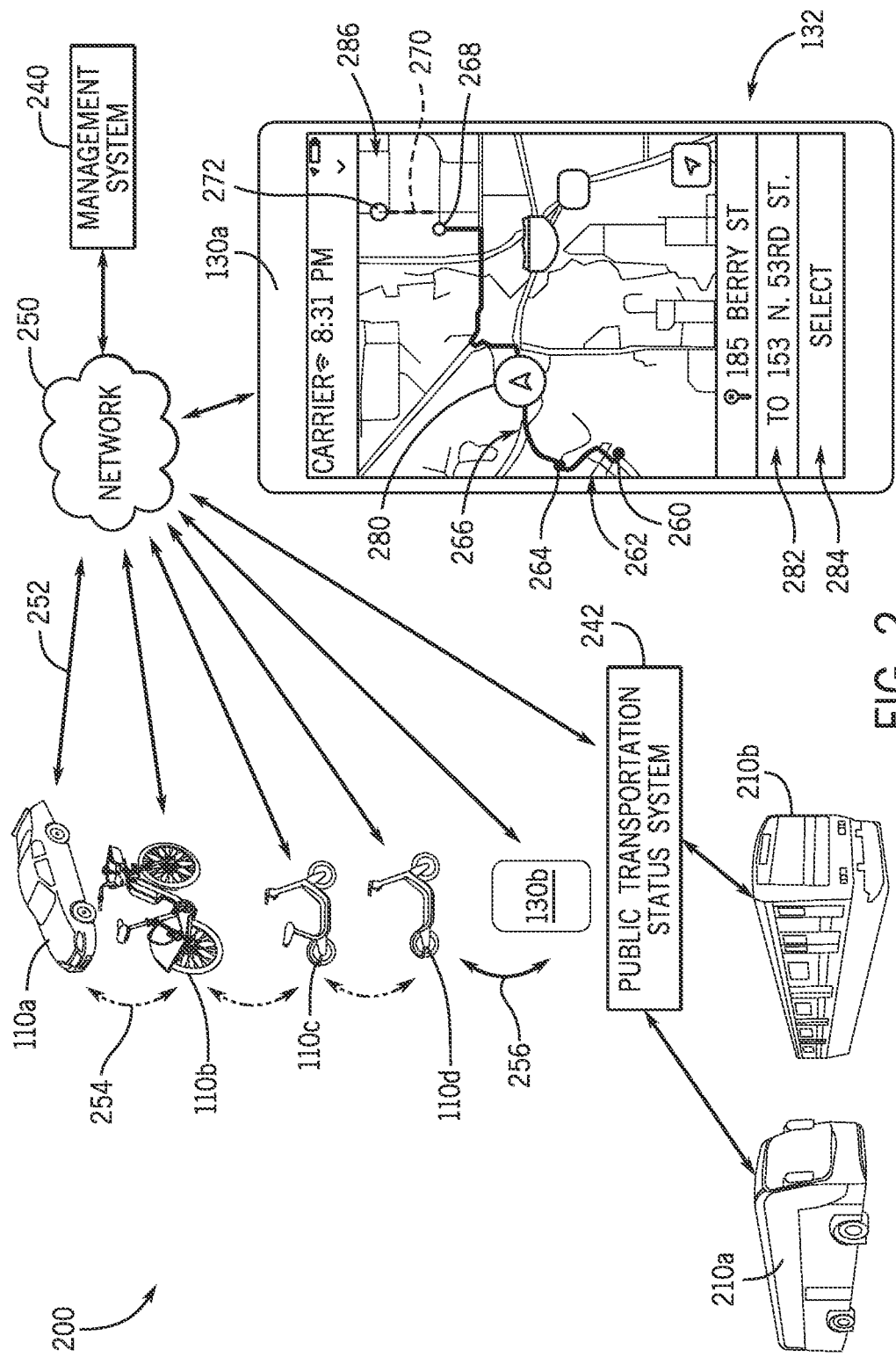
FIG. 2 illustrates a block diagram of a dynamic transportation matching system incorporating a variety of transportation modalities, in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210*a* or 210*b*), and a micromobility route 270 (e.g., using one or more of micromobility transit vehicles 110*b*, 110*c*, or 110*d*) from bus stop 268 to destination 272. Also shown rendered by user interface 132 are a present location indicator 280 (indicating a present absolute position of user device 130*a* on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130*a*, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
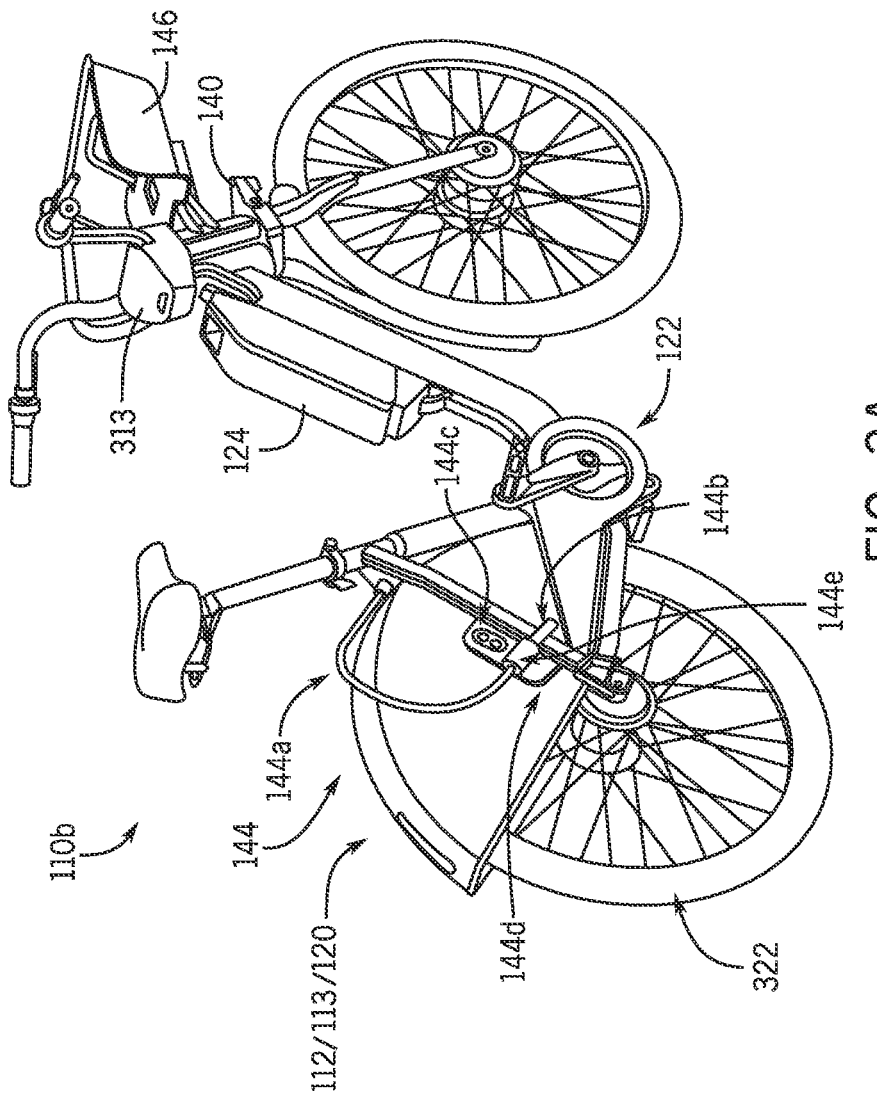
FIGS. 3A, 3B, and 3C illustrate respective diagrams of micromobility transit vehicles for use in a dynamic transportation matching system, in accordance with an embodiment of the disclosure.
Figure 3B:
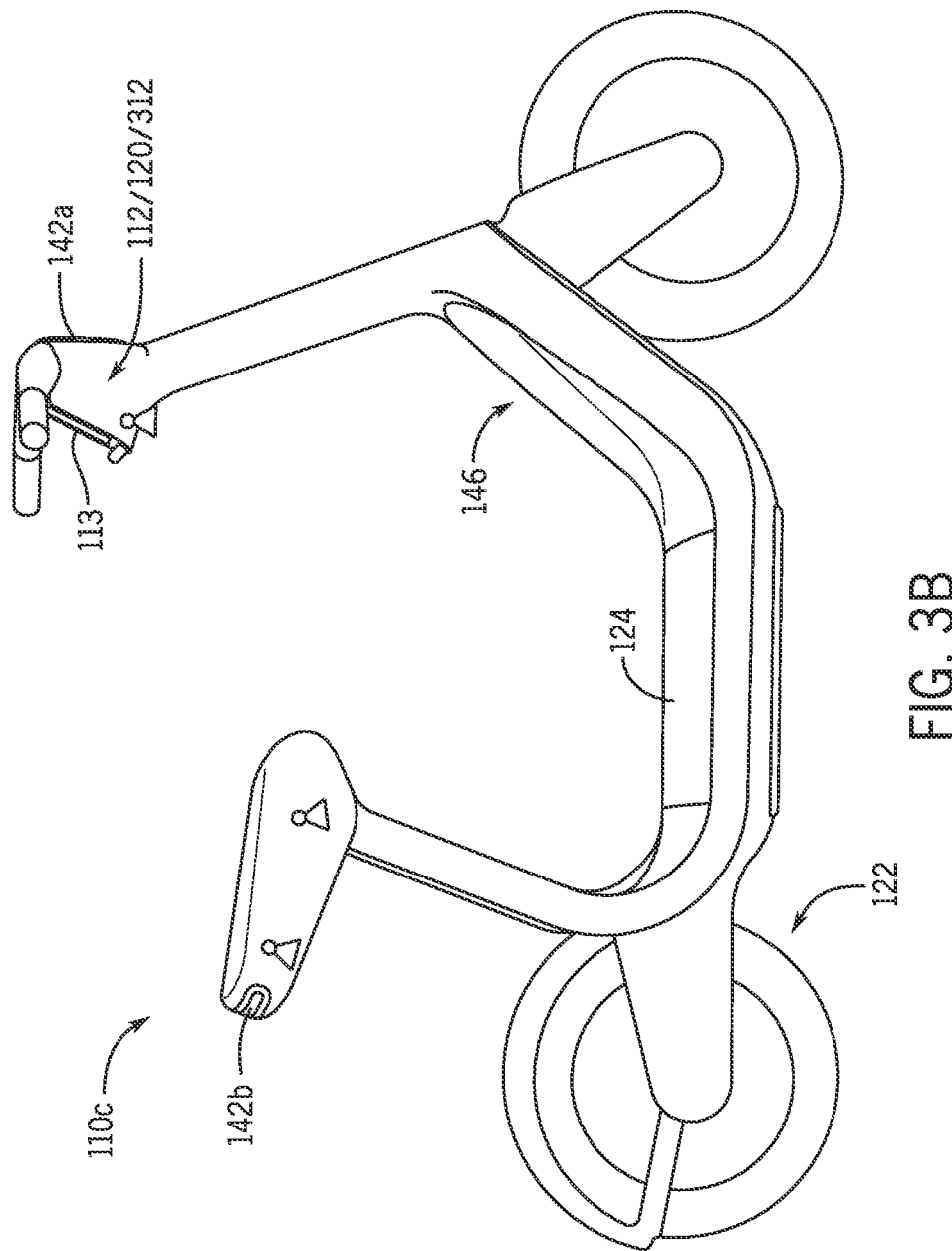
Figure 3C:
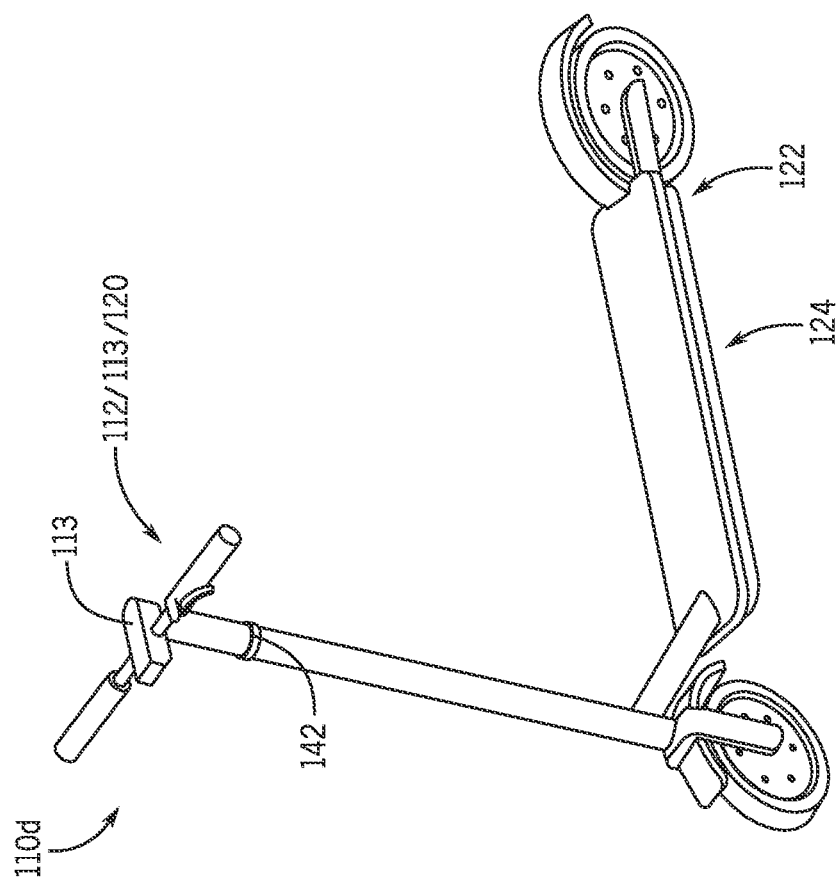

FIGS. 3A, 3B, and 3C illustrate respective diagrams of micromobility transit vehicles 110*b*, 110*c*, and 110*d*, which may be integrated network systems in accordance with an embodiment of the disclosure. For example, transit vehicle 110*b* of FIG. 3A may correspond to a motorized bicycle integrated with the various elements of system 100 and may be configured to participate in dynamic transportation matching system 200 of FIG. 2. As shown, transit vehicle 110*b* includes controller/user interface/wireless communications module 112/113/120 (e.g., integrated with a rear fender of transit vehicle 110*b*), propulsion system 122 configured to provide motive power to at least one of the wheels (e.g., a rear wheel 322) of transit vehicle 110*b*, battery 124 for powering propulsion system 122 and/or other elements of transit vehicle 110*b*, docking mechanism 140 (e.g., a spade lock assembly) for docking transit vehicle 110*b* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*b* by default, thereby requiring a transportation requester or rider to transmit a request to management system 240 (e.g., via user device 130) to reserve transit vehicle 110*b* before attempting to use transit vehicle 110*b*. The request may identify transit vehicle 110*b* based on an identifier (e.g., a QR code, a barcode, a serial number, etc.) presented on transit vehicle 110*b* (e.g., such as by user interface 113 on a rear fender of transit vehicle 110*b*). Once the request is approved, management system 240 may transmit an unlock signal to transit vehicle 110*b* (e.g., via network 250). Upon receiving the unlock signal, transit vehicle 110*b* (e.g., controller 112 of transit vehicle 110*b*) may release vehicle security device 144 and unlock rear wheel 322 of transit vehicle 110*b*.

Transit vehicle 110*c* of FIG. 3B may correspond to a motorized sit-scooter integrated with the various elements of system 100 and may be configured to participate in dynamic transportation matching system 200 of FIG. 2. As shown in FIG. 3B, transit vehicle 110*c* includes many of the same elements as those discussed with respect to transit vehicle 110*b* of FIG. 3A. For example, transit vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of head lights, programmable light strips, and/or reflective strips.

Transit vehicle 110*d* of FIG. 3C may correspond to a motorized stand or kick scooter integrated with the various elements of system 100 and may be configured to participate in dynamic transportation matching system 200 of FIG. 2. As shown in FIG. 3C, transit vehicle 110*d* includes many of the same elements as those discussed with respect to transit vehicle 110*b* of FIG. 3A. For example, transit vehicle 110*d* may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
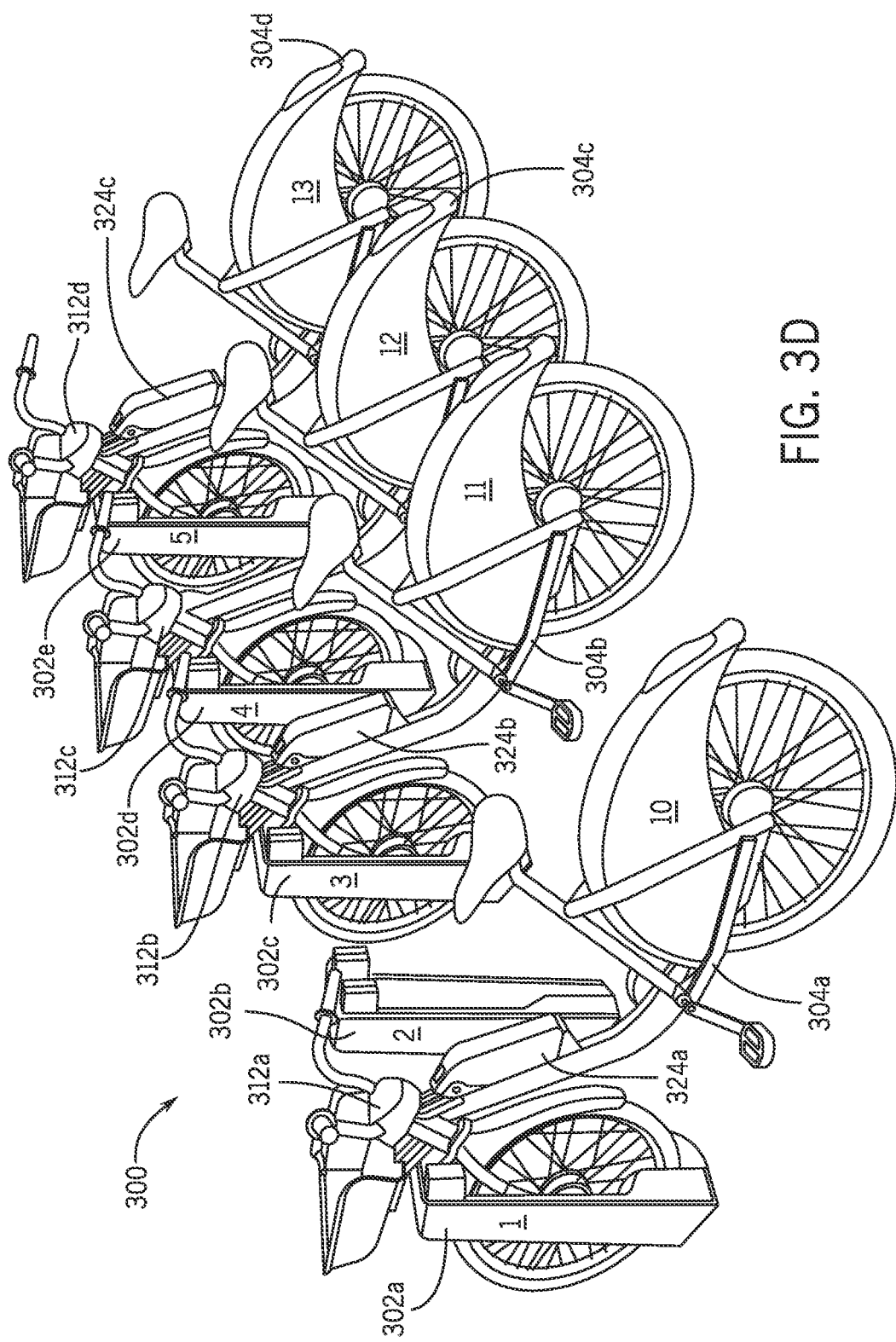
FIG. 3D illustrates a diagram of a docking station for docking one or more micromobility transit vehicles, in accordance with an embodiment of the disclosure.

FIG. 3D illustrates a docking station 300 for docking transit vehicles (e.g., transit vehicles 110*c*, 110*e*, and 110*g*, etc.) according to one embodiment. As shown, docking station 300 may include multiple bicycle docks, such as docks 302*a-e*. In this example, a single transit vehicle (e.g., any one of electric bicycles 304*a-d*) may dock in each of the docks 302*a-e* of the docking station 300. Each of the docks 302*a-e* may include a lock mechanism for receiving and locking docking mechanism 140 of the electric bicycles 304*a-d*. In some embodiments, once a transit vehicle is docked in a bicycle dock, the dock may be electronically coupled to the transit vehicle (e.g., controllers 312*a-d* of the transit vehicle) via a link such that the transit vehicle and the dock may communicate with each other via the link.

A transportation requester or rider may use a user device (e.g., user device 130) to use a micromobility transit vehicle 110*b-d* that is docked in one of the bicycle docks 302*a-e* by transmitting a request to management system 240. Once the request is processed, management system 240 may transmit an unlock signal to a micromobility transit vehicle 110*b-d* docked in the dock and/or the dock via network 250. The docking station 300 may automatically unlock the lock mechanism to release the micromobility transit vehicle 110*b-d* based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
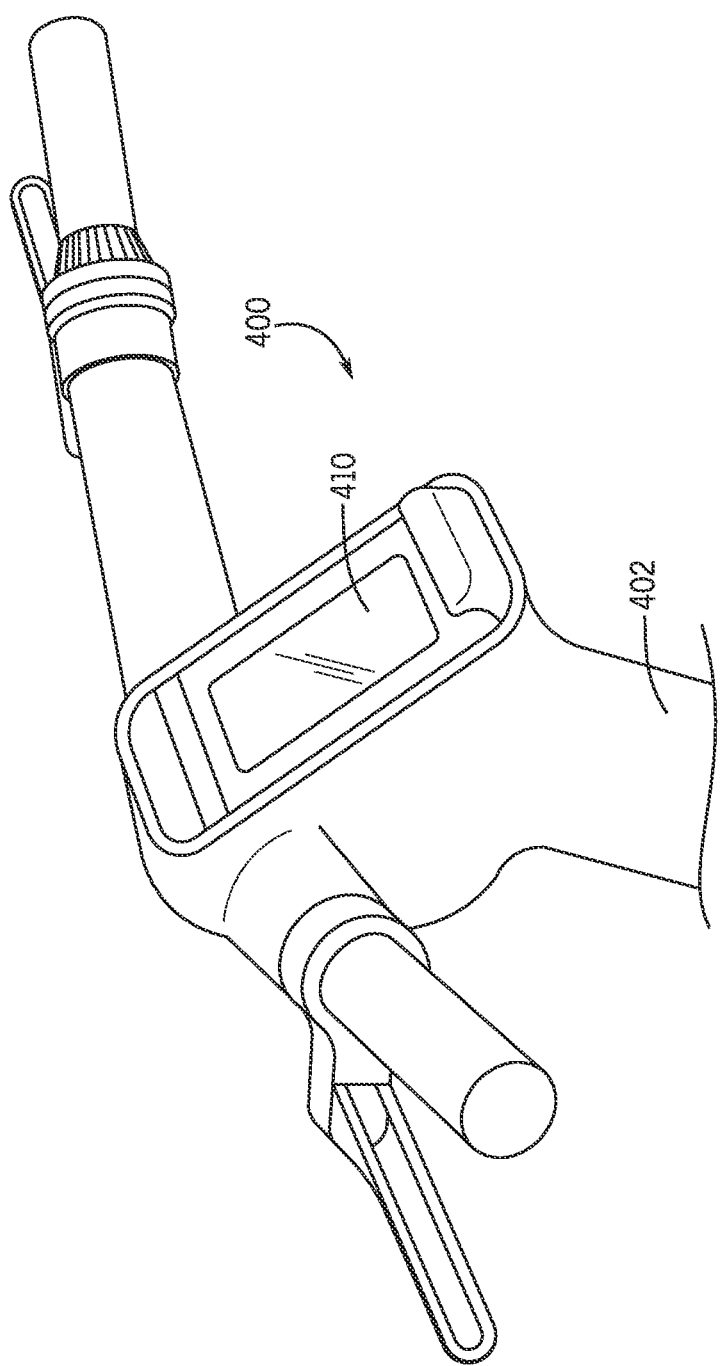
FIG. 4 illustrates a diagram of a user interface associated with a micromobility transit vehicle, in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110*b*, 110*c*, or 110*d*, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
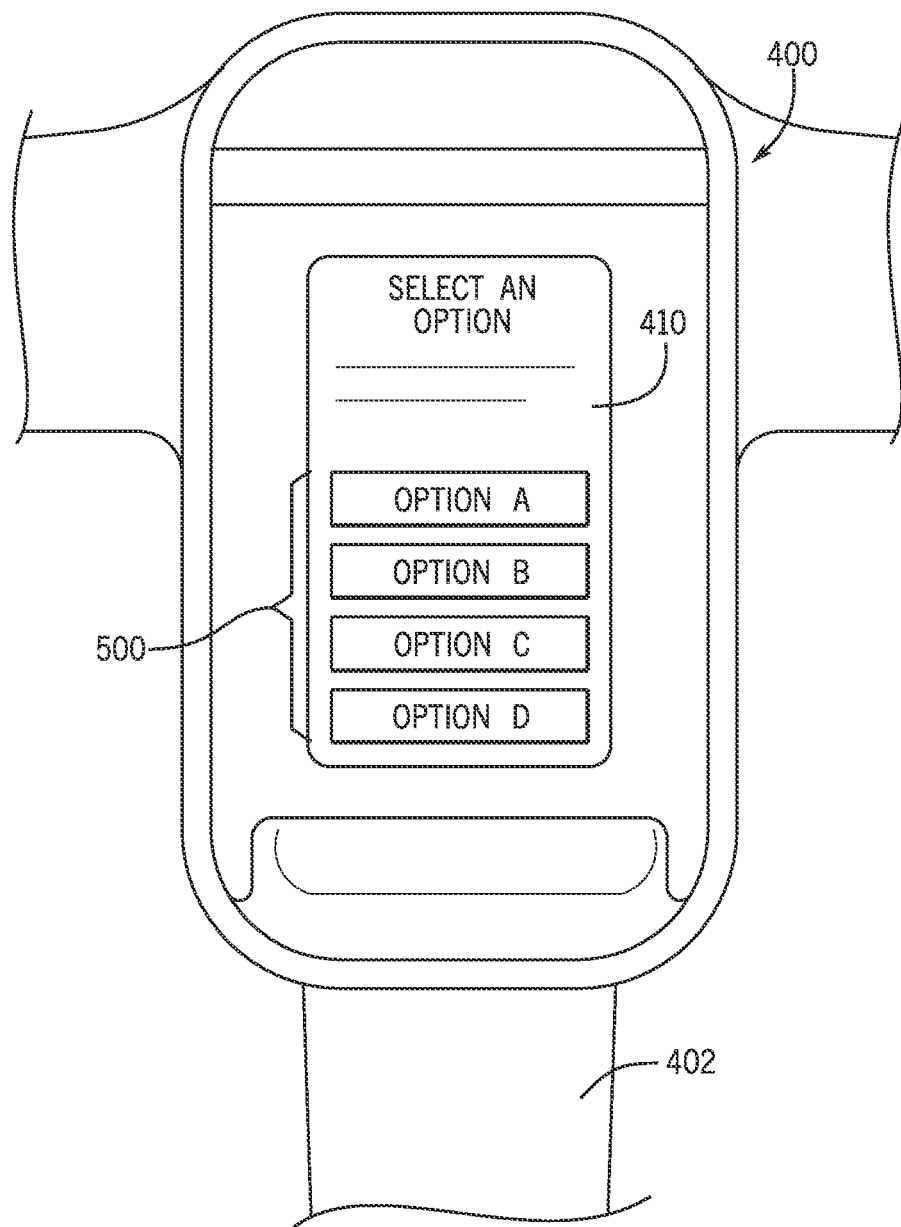
FIGS. 5A, 5B, and 5C illustrate respective diagrams of various examples of information rendered on a display of the user interface of FIG. 4, in accordance with an embodiment of the disclosure.
Figure 5B:
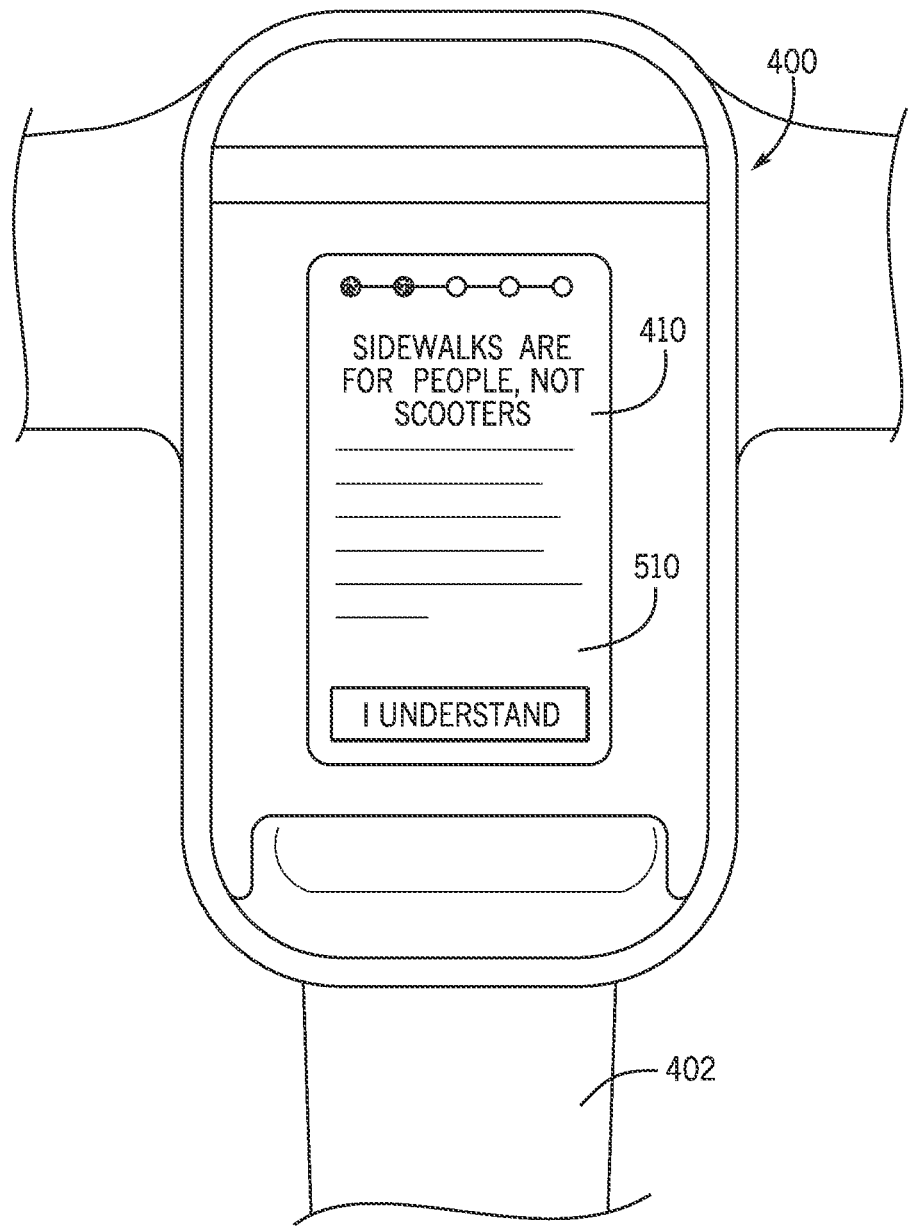
Figure 5C:
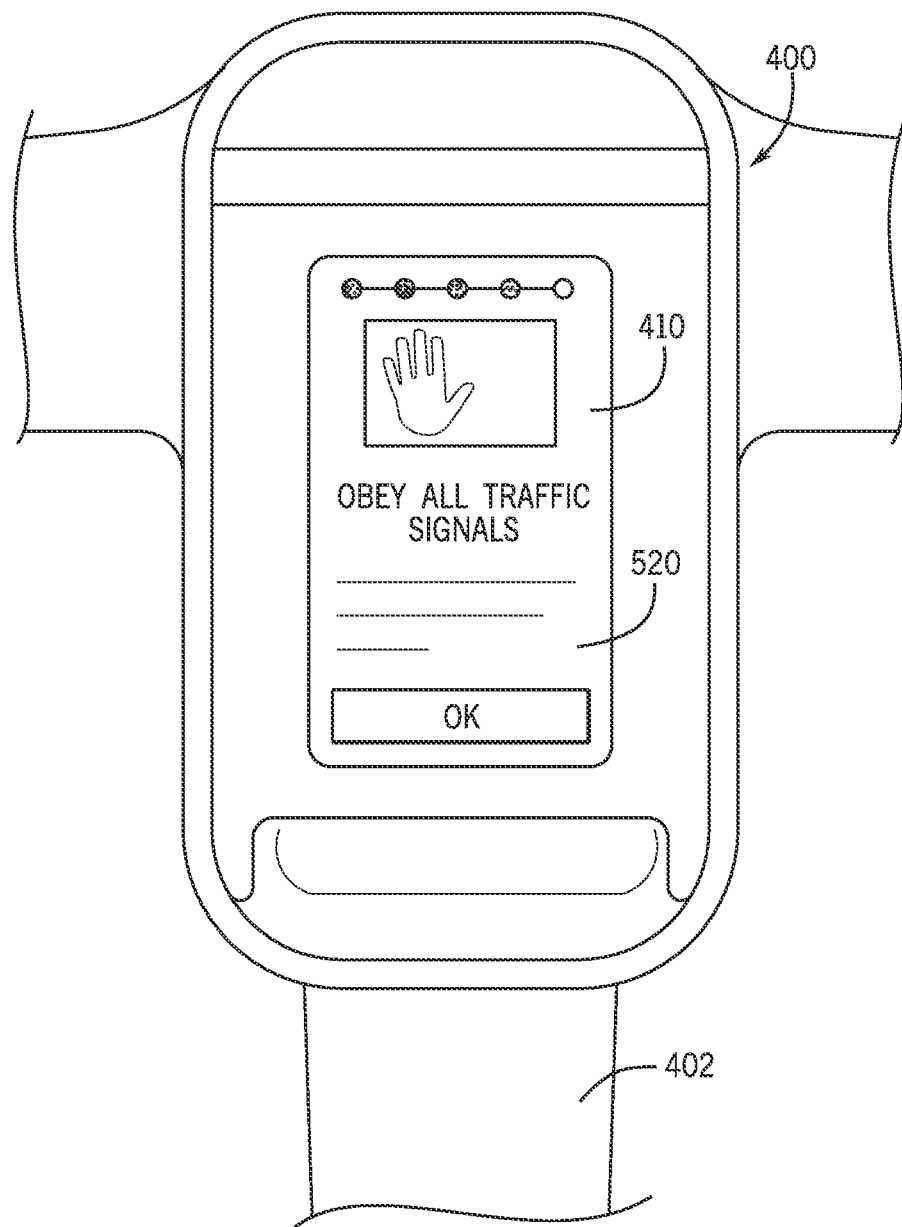

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
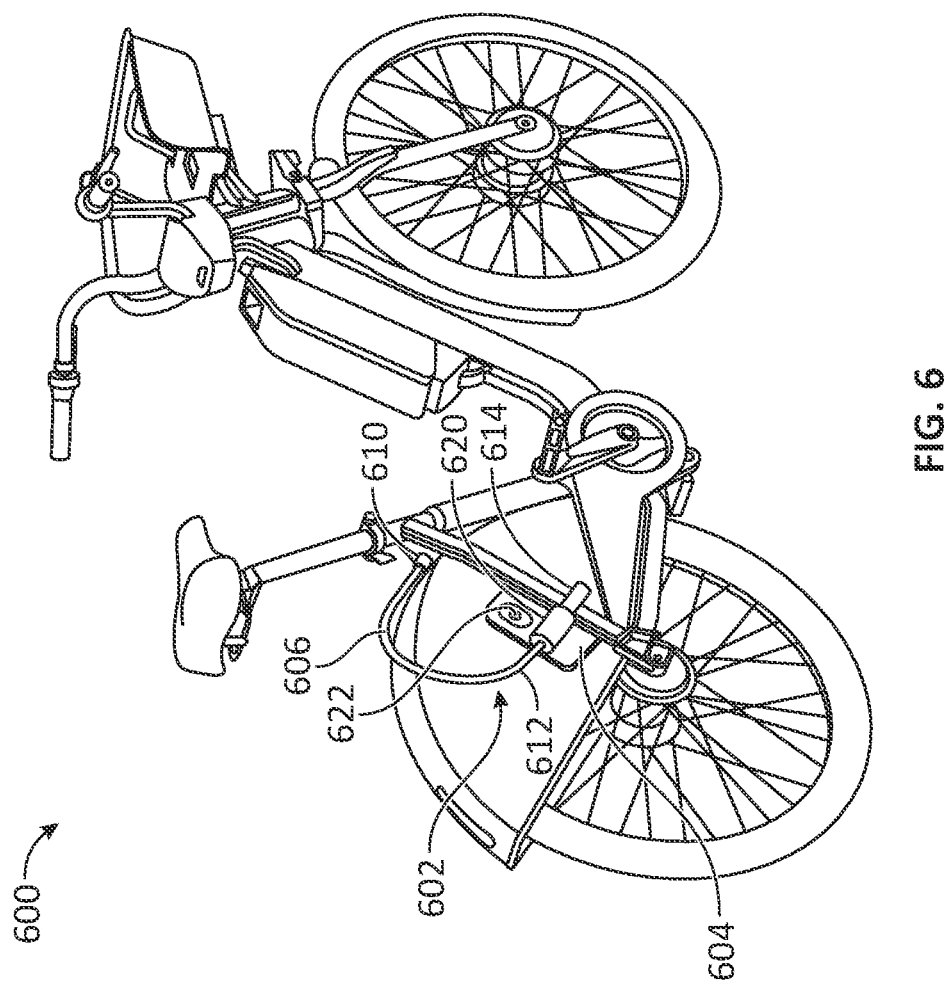
FIG. 6 illustrates a diagram of a micromobility transit vehicle, in accordance with an embodiment of the disclosure.

FIG. 6 illustrates a diagram of a micromobility transit vehicle 600, in accordance with an embodiment of the disclosure. The micromobility transit vehicle 600 may include many configurations. For example, the micromobility transit vehicle 600 may be an electric bike (or e-bike), similar to the micromobility transit vehicle 110b of FIG. 3A, discussed above, although other configurations are contemplated, including scooters, sit-scooters, and other micromobility vehicles. Thus, any components of the illustrated micromobility transit vehicle 600 may be embodied in other vehicle types, where appropriate.

Referring to FIG. 6, the micromobility transit vehicle 600 may include a lock assembly 602. The lock assembly 602 may be configured to lock the micromobility transit vehicle 600 to a structure, such as to a bike rack, a pole, or other suitable fixed structure. The lock assembly 602 may be similar to the vehicle security device 144 of FIG. 3A, discussed above. For example, the lock assembly 602 may be a cable lock that wraps around and/or through a pole, fence, or bike rack, among others, to secure the micromobility transit vehicle 600. In embodiments, the lock assembly 602 may include a lock 604 and a cable 606 securable to the lock 604. As shown, the cable 606 includes a first end 610 coupled or attached to the micromobility transit vehicle 600, and a second end 612 defining or including a locking pin 614. The first end 610 may be fixed to the micromobility transit vehicle 600, such as to a portion of the vehicle's frame. In embodiments, the securement of the first end 610 to the micromobility transit vehicle 600 may allow the first end 610 to move relative to the frame. For example, the first end 610 may rotate about its axis or about a frame member to position the cable 606 for locking the micromobility transit vehicle 600, such as to permit ambidextrous locking and/or locking to different structures. In some embodiments, the cable 606 may be positioned along the longitudinal axis of the micromobility transit vehicle 600. For example, the cable 606 may be positioned along the spine of the micromobility transit vehicle 600, such as along the top of the rear fender. The length of the cable 606 and the positions of the lock 604 and cable mounting point may be implemented to position the cable 606 longitudinally along the rear fender.

As shown, the lock 604 may include a holster 620 and a pin latch 622. The holster 620 may secure the locking pin 614 when disengaged from the lock 604, such as during transport or use of the micromobility transit vehicle 600. In some embodiments, the holster 620 may be defined or positioned on the rear fender, such that the cable 606 may be positioned along the rear fender to secure the cable 606 in place (e.g., when the locking pin 614 is engaged in the holster 620). The pin latch 622 may lockably receive the locking pin 614 to secure the micromobility transit vehicle 600. For example, the locking pin 614 may be removed from the holster 620 and the cable 606 wrapped around and/or through a bike rack (or other object) to secure the locking pin 614 to the pin latch 622. In embodiments, the locking pin 614 may engage a docking station (e.g., docking station 300) to secure the micromobility transit vehicle 600 to the docking station.

Depending on the application, a rider of the micromobility transit vehicle 600 may be required or prompted to secure the locking pin 614 to either the holster 620 or the pin latch 622. For example, a notification may prompt the rider to secure the locking pin 614 to the holster 620 when the micromobility transit vehicle 600 is in use. In some embodiments, it may be required to secure the locking pin 614 to the pin latch 622 to end or complete a ride. In such embodiments, the lock assembly 602 may include one or more sensors to sense a condition of the lock assembly 602. For example, one or more sensors may detect a position of the locking pin 614 when it is maintained in the holster 620 and as the locking pin 614 is inserted into the lock 604. Detection of the locking pin 614 within the holster 620 may be useful to detect that the locking pin 614 remains securely engaged in the holster 620 during vehicle operation and is not at risk of becoming entangled with a moving part (e.g., wheels, spokes, chain, etc.) of the micromobility transit vehicle 600. In embodiments, one or more sensors may detect a state or configuration of the lock 604, such as whether the lock 604 is in a locked condition or an unlocked condition, as described more fully below. For example, additional sensors may be provided to detect the position of the lock 604 and related mechanical features so that the current state of the lock 604 can be accurately monitored.

Figure 7:
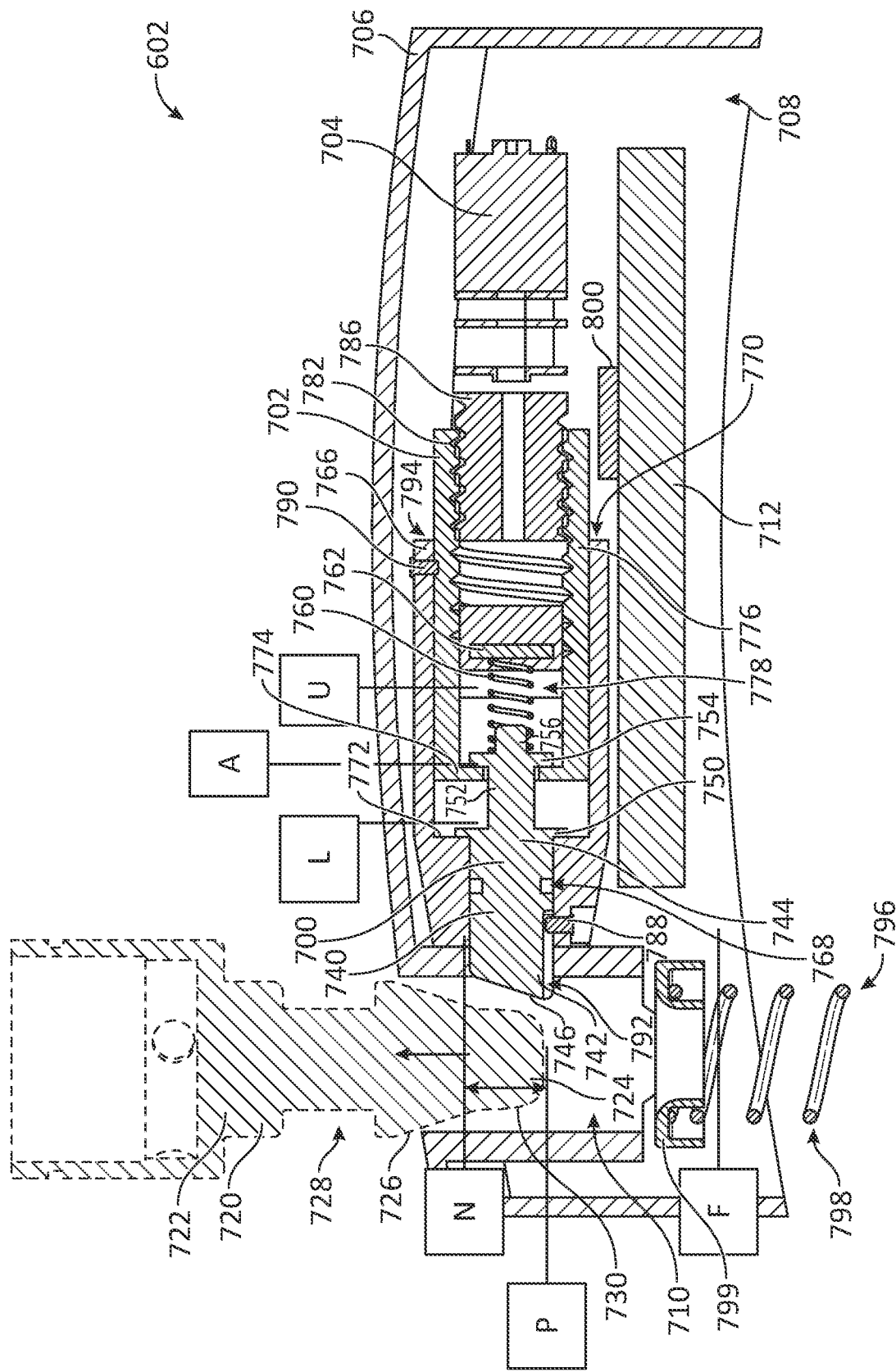
FIG. 7 illustrates a cross-sectional diagram of a lock assembly and showing the lock assembly in a first state, in accordance with an embodiment of the disclosure.
Figure 8:
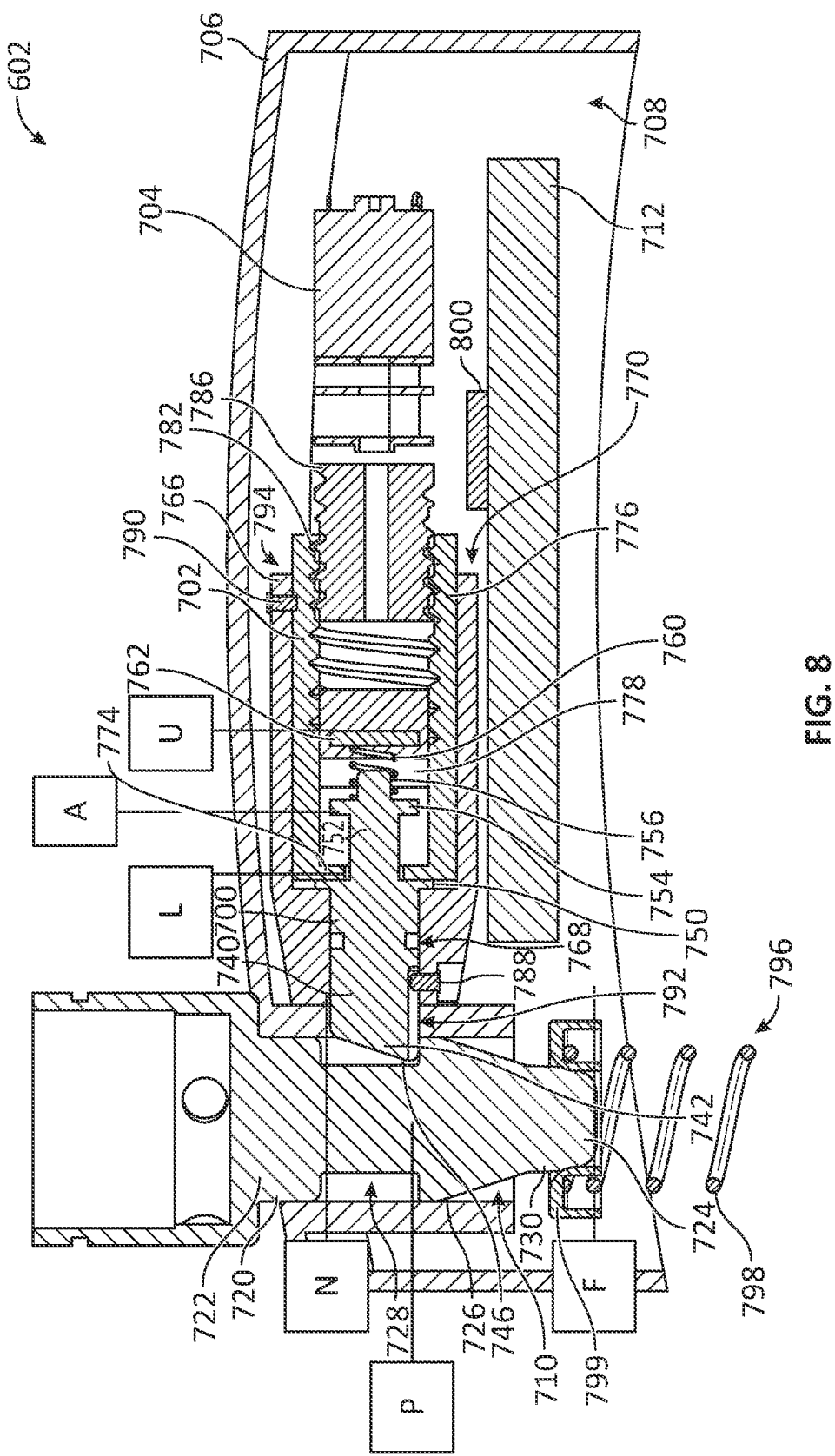
FIG. 8 illustrates a cross-sectional diagram of the lock assembly in a second state, in accordance with an embodiment of the disclosure.
Figure 9:
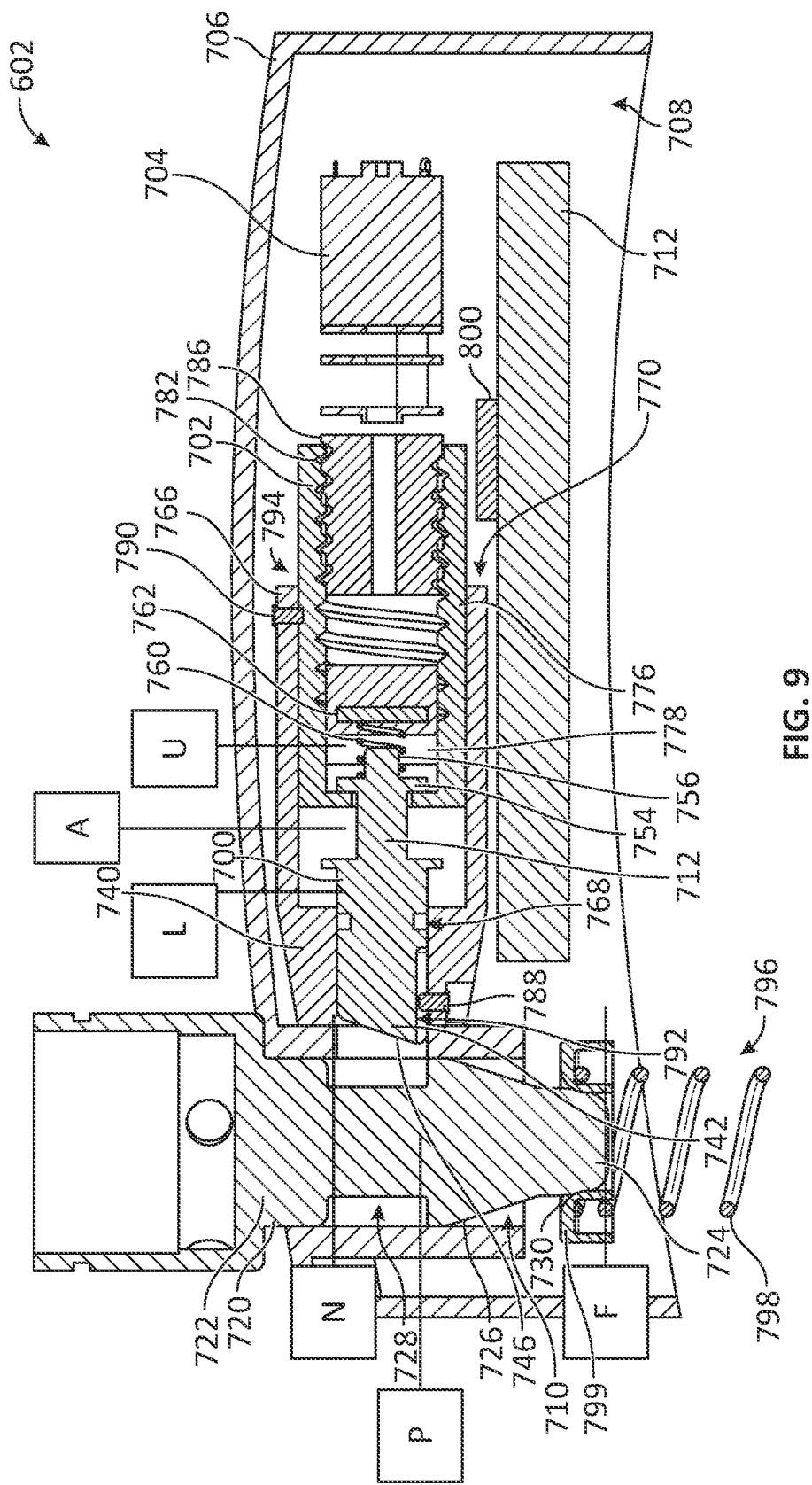
FIG. 9 illustrates a cross-sectional diagram of the lock assembly in a third state, in accordance with an embodiment of the disclosure.

FIG. 7 illustrates a cross-sectional diagram of the lock assembly 602 in a first state, in accordance with an embodiment of the disclosure. FIG. 8 illustrates a cross-sectional diagram of the lock assembly 602 in a second state, in accordance with an embodiment of the disclosure. FIG. 9 illustrates a cross-sectional diagram of the lock assembly 602 in a third state, in accordance with an embodiment of the disclosure. Referring to FIGS. 7-9, the lock assembly 602 may include a latch 700, an actuator 702, and an electric motor 704. The latch 700, actuator 702, and electric motor 704 may be accommodated at least partially within the lock 604, such as within a housing 706 of the lock 604. For example, the housing 706 may include a cavity 708 and a lock cylinder 710. The latch 700, actuator 702, and electric motor 704 may be positioned at least partially within the cavity 708. The cavity 708 may house other components of the lock assembly 602, including a printed circuit board assembly (PCBA) 712, among other components. Referring to FIG. 6, the housing 706 may be shaped for integration with a rear fender of the micromobility transit vehicle 600. For example, the housing 706 may be tightly integrated for the rear fender. In embodiments, the housing 706 may have a rectangular form factor, although different shapes are contemplated and can be implemented for different vehicles and vehicle mounting.

Referring to FIGS. 7-9, the locking pin 614 may be positioned within the lock cylinder 710 to secure the locking pin 614 to the lock 604. For example, the latch 700 may extend at least partially within the lock cylinder 710 to engage the locking pin 614 and lock the locking pin 614 in place. As shown, the locking pin 614 includes a shaft 720 having a base 722 and a tip 724. An incline surface 726 may be defined adjacent to the tip 724, and a groove 728 may be disposed radially around the shaft 720 between the incline surface 726 and the base 722. Depending on the application, the incline surface 726 may be defined a distance from the tip 724 to define a bearing surface 730 at the tip 724.

The latch 700 may include many configurations to engage and secure the locking pin 614. In embodiments, the latch 700 includes a body 740 having a first end 742 and a second end 744. The first end 742 may be sloped, such as defining a ramp 746, to allow insertion of the locking pin 614 within the lock cylinder 710. The second end 744 may include a first flange 750. A rod 752 may extend from the second end 744, such as from the first flange 750. The end of the rod 752 may include a second flange 754, and a post 756 may extend from the second flange 754. In embodiments, the body 740, rod 752, post 756, first flange 750, and second flange 754, or any combination thereof, may be concentric or aligned coaxially along an axis.

The latch 700 may be movable between a first configuration and a second configuration. The first configuration may position the latch 700 for engagement with the locking pin 614 (see FIGS. 7 and 8). The first configuration may be at, near, or associated with position L shown in FIGS. 7-9. The first configuration may engage the latch 700 with the locking pin 614 to secure the locking pin 614 in place. For example, the first configuration may position the first end 742 of the latch 700 within the lock cylinder 710 for engagement with the locking pin 614, such as positioning of the first end 742 within the groove 728 of the shaft 720. The second configuration may be at, near, or associated with position U shown in FIGS. 7-9. The second configuration may disengage the latch 700 from the locking pin 614 (see FIG. 9). The second configuration may remove the first end 742 of the latch 700 from the groove 728 to disengage the latch 700 from the locking pin 614. In embodiments, the latch 700 may move axially between the first configuration and the second configuration. For instance, the latch 700 may move axially towards the lock cylinder 710 to insert the first end 742 further within the lock cylinder 710. In like manner, the latch 700 may move axially away from the lock cylinder 710 to withdraw at least portions of the first end 742 from the lock cylinder 710. In embodiments, the latch 700 may be biased towards one of its configurations. For example, the lock assembly 602 may include a spring 760 coupled between a ledge 762 and the latch 700 and biasing the latch 700 to the first configuration. As shown, the spring 760 may be coupled to the post 756 of the latch 700, such as the post 756 positioned within the interior of the spring 760. In such embodiments, the latch 700 may move towards the first configuration, such as automatically, under the bias of the spring 760 absent a force moving the latch 700 to the second configuration.

In embodiments, at least one of the first configuration or the second configuration may be defined by a stop. For instance, the latch 700 may move towards the lock cylinder 710 until the first flange 750 engages a portion of the lock 604. For instance, the lock 604 may include a guide 766 secured within the cavity 708 of the housing 706. As shown, the guide 766 is a hollow member having a first bore 768 and a second bore 770. The diameter of the second bore 770 may be greater than the diameter of the first bore 768 to define an end surface 772 at the transition between the first bore 768 and the second bore 770. The latch 700 (e.g., the body 740 of the latch 700) may slide within the first bore 768 of the guide 766 until the first flange 750 engages the end surface 772, defining the first configuration of the latch 700 and the extent of movement of the latch 700 towards the lock cylinder 710.

The guide 766 may be designed to provide a tamper protection to lock assembly 602. For example, the tolerances between the latch 700 and the first bore 768 may be tighter than the tolerances between the latch 700 and the actuator 702. Such configurations may limit or prevent a load introduced on or applied to the actuator 702, leadscrew 786, or electric motor 704, among other components of the lock assembly 602, when an external force is applied to the latch 700, such as via an upward force applied to the locking pin 614. As the latch 700 is moved under the external force (e.g., pulled upward with the locking pin 614), the latch 700 will exert pressure against the guide 766 due to the tight tolerances at the latch/guide interface. The latch 700, however, may not exert force on the actuator 702 due to the larger tolerances at the latch/actuator interface. For example, a tolerance between the actuator 702 and the latch 700 (e.g., as shown in FIGS. 7-9 by a gap between end wall 774 and rod 752) may limit a load applied to the actuator 702 (and consequently the leadscrew 786 or electric motor 704) by the latch 700. For instance, the tolerance between the actuator 702 and the latch 700 may limit one or more forces applied to the actuator 702 by latch 700 caused by movement of the latch 700 resulting from the locking pin 614 pulling or pushing against the latch 700. As a result, the actuator 702, leadscrew 786, and/or electric motor 704 may be effectively decoupled from the latch 700 and locking pin 614, such that the actuator 702, leadscrew 786, and/or electric motor 704 will not be damaged by the tampering.

The actuator 702 may be coupled to the latch 700 and movable between a plurality of positions to move the latch 700 between the first configuration and the second configuration. As shown, the actuator 702 may be slidable within the guide 766, such as within the second bore 770, to move the actuator 702 between positions. The actuator 702 may include an end wall 774 and a side wall 776 extending from the end wall 774 and defining a cylindrical internal cavity 778. An aperture 780 may be disposed in the end wall 774 to receive a portion of the latch 700. For example, the rod 752 may be positioned to slide within the aperture 780, with at least a portion of the end wall 774 positioned between the first flange 750 and the second flange 754. The aperture 780 may have a diameter smaller than the first flange 750 and the second flange 754. In such embodiments, the rod 752 may slide within the aperture 780 until either the first flange 750 or the second flange 754 engages the end wall 774 of the actuator 702. As shown, the spring 760, post 756, and second flange 754 may be positioned within the internal cavity 778 of the actuator 702. In embodiments, the side wall 776 may include internal threads 782 to couple the actuator 702 to the electric motor 704, as detailed below.

Depending on the application, the actuator 702 may be movable between a first position, a second position, and a third position. The first position may be at, near, or associated with position L shown in FIGS. 7-9. The first position of the actuator 702 may move the latch 700 to the first configuration (see FIG. 8). For example, the first position may situate (e.g., push) the actuator 702 against a first portion of the latch 700 to lock the lock assembly 602. As shown in FIG. 8, the end wall 774 of the actuator 702 may engage the first flange 750 of the latch 700 and push the first flange 750 against the end surface 772 of the guide 766, although other configurations are contemplated. In such configurations, the latch 700 may be prevented from moving to the second configuration, such as to unlock the lock assembly 602. As a result, the first position of the actuator 702 (with the latch 700 positioned in the first configuration)

may be referred to or considered a fully-locked position, with the latch 700 prevented from unlocking.

Referring to FIG. 9, the second position of the actuator 702 may move the latch 700 to the second configuration. For instance, the second position may situate (e.g., pull) the actuator 702 against a second portion of the latch 700 to unlock the lock assembly 602. The second position may be at, near, or associated with position U shown in FIGS. 7-9. As shown, the end wall 774 of the actuator 702 may engage the second flange 754 of the latch 700 and pull the latch 700 away from the lock cylinder 710, although other configurations are contemplated. In such configurations, the latch 700 may be prevented from moving to the first configuration, such as to lock the lock assembly 602. As a result, the second position of the actuator 702 may be referred to or considered an unlocked position, with the latch 700 prevented from locking, so the locking pin 614 can be removed from the lock cylinder 710.

Referring to FIG. 7, the third position of the actuator 702 may allow the latch 700 to move between the first configuration and the second configuration. For example, the third position may situate the actuator 702 such that the latch 700 may move (e.g., freely) between the first configuration and the second configuration. The third position may be at, near, or associated with position A shown in FIGS. 7-9. The end wall 774 of the actuator 702 may be positioned along the length of the rod 752 between the first flange 750 and the second flange 754. In embodiments, the end wall 774 may be positioned against or adjacent to the second flange 754 and in a position allowing the first flange 750 to engage the end surface 772 of guide 766. In such configurations, the latch 700 may slide away from the lock cylinder 710, such as the first flange 750 moving away from the end surface 772 and towards the end wall 774, to move the latch 700 between configurations. In some embodiments, the latch 700 may move towards the actuator 702 until the first flange 750 engages the end wall 774 of the actuator 702 to define the second configuration of the latch 700. Such configurations may allow the latch 700 to move between configurations to first accept and then lock the locking pin 614 to the lock 604. As a result, the third position of the actuator 702 may be referred to or considered an autolock position, with the latch 700 permitted to move to accept and autolock to the locking pin 614.

The electric motor 704 may be operable to move the actuator 702 between positions. For example, the electric motor 704 may be coupled to the actuator 702, so actuation of the electric motor 704 moves the actuator 702. As shown, the lock assembly 602 may include a leadscrew 786. In such embodiments, the electric motor 704 drives the actuator 702 through the leadscrew 786. The leadscrew 786 is connected to the electric motor 704 and threaded to the internal threads 782 of the actuator 702, such that rotation of the leadscrew 786 by the electric motor 704 moves the actuator 702 between positions. For instance, the electric motor 704 may rotate the leadscrew 786 in a first rotational direction to move the actuator 702 towards the latch 700. Conversely, the electric motor 704 may rotate the leadscrew 786 in a second rotational direction to move the actuator 702 away from the latch 700.

The lock assembly 602 may include other features as desired. In embodiments, the lock assembly 602 may include a first guide pin 788 and a second guide pin 790. The first guide pin 788 may extend within the first bore 768 of the guide 766 to engage the latch 700. For example, the first guide pin 788 may be positioned within a first track 792 disposed in the body 740 of the latch 700 to limit or prevent rotation of the latch 700, such as rotation of the latch 700 about its long axis. The first track 792 may extend along a length of the latch 700 to facilitate movement of the latch 700 between the first configuration and the second configuration. The second guide pin 790 may extend within the second bore 770 of the guide 766 to engage the actuator 702. The second guide pin 790 may be positioned within a second track 794 disposed in the sidewall of the actuator 702 to limit or prevent rotation of the actuator 702, such as rotation of the actuator 702 about its long axis. The second track 794 may extend along a length of the actuator 702 to facilitate movement of the actuator 702 between the positions.

In embodiments, the lock assembly 602 may include a pop mechanism 796. The pop mechanism 796 may be positioned at the bottom of the lock cylinder 710 to engage at least a portion of the locking pin 614 (e.g., the tip 724). The pop mechanism 796 may include a spring (or spring-like element) 798 biasing the locking pin 614 out of the lock cylinder 710. As shown, the spring 798 may be coupled to a sleeve 799. The sleeve 799 may slide within the lock cylinder 710. The sleeve 799 may engage the tip 724 of the locking pin 614, such as the tip 724 inserted at least partially into the sleeve 799. Insertion of the locking pin 614 into the lock cylinder 710 may engage the tip 724 with the sleeve 799 to move the sleeve 799 towards the bottom of the lock cylinder 710 against the bias of the spring 798 until the latch 700 engages the locking pin 614 to lock the locking pin 614 in place. In embodiments, the sleeve 799 may support the locking pin 614 within the lock cylinder 710. For example, the sleeve 799 may limit lateral movement of the locking pin 614 towards the walls defining the lock cylinder 710. In some embodiments, the sleeve 799 may be omitted, with the spring 798 itself engaging the locking pin 614. When the lock assembly 602 is unlocked, the pop mechanism 796 may pop the locking pin 614 at least partially out of the lock cylinder 710. As a result, the pop mechanism 796 may provide visual feedback to a user that the lock assembly 602 is unlocked. Additionally, or alternatively, the pop mechanism 796 may facilitate removal of the locking pin 614 from the lock cylinder 710.

With continued reference to FIGS. 7-9, the lock assembly 602 may include a controller 800. The controller 800 may be associated with or coupled to the PCBA 712. The controller 800 may receive one or more input signals from various sensors, as discussed herein. For example, controller 800 may receive input signals from various sensor arrangements to determine a state or configuration of the lock assembly 602, such as the positions of the various lock components (e.g., latch 700, actuator 702, locking pin 614, etc.). The controller 800 may be connected to the sensors via various signal paths, either wired or wireless (not illustrated for sake of convenience). In embodiments, controller 800 may maintain a state machine, as discussed herein. For example, the controller 800 may operate a state machine based on the detected state or configuration of the lock assembly 602.

Controller 800 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of lock assembly 602, for example.

FIG. 7 illustrates the lock assembly 602 in a first state. The first state may be an autolock state of the lock assembly 602. In the first state, the actuator 702 may be positioned in the third position, with the latch 700 free to move between the first configuration and the second configuration. The autolock state of the lock assembly 602 may enable user actuated movement of the latch 700 during locking. For example, locking may be mechanical, such as entirely mechanical, in the autolock or first state. In the first state, the locking pin 614 may be positioned adjacent the lock 604 to position the shaft 720 within the lock cylinder 710. The tip 724 of the shaft 720 may be inserted into the lock cylinder 710 until the incline surface 726 engages the ramp 746 of the latch 700, whereupon further insertion of the locking pin 614 within the lock cylinder 710 causes the latch 700 to retract into the cavity 708 of the housing 706 against the bias of the spring 760. For example, the latch 700 may be moved from the first configuration to the second configuration as the ramp 746 rides up the incline surface 726 of the locking pin 614 during insertion. The locking pin 614 may be inserted further into the lock cylinder 710 until the first end 742 of the latch 700 aligns with the groove 728 disposed in the shaft 720, whereupon the latch 700 moves (e.g., snaps) back into the first configuration under the bias of the spring 760 to position the first end 742 of the latch 700 within the groove 728 and lock the locking pin 614 in place. As shown, the bearing surface 730 at the tip 724 of the locking pin 614 may be positioned within a bearing or other structure at the bottom of the lock cylinder 710, although other configurations are contemplated.

FIG. 8 illustrates the lock assembly 602 in a second state. The second state may be a fully-locked, full-lock, or superlock state of the lock assembly 602. The second state may take up slack in the mechanism for robustness, predictability, and/or reliability. In embodiments, the second state may produce less rattling and/or increase theft resistance compared to other states of the lock assembly 602. For example, outside of the second state, an impact to the lock assembly 602 (e.g., to the locking pin 614) may create enough inertial effect to move the latch 700. In the second state, the latch 700 may be positioned in the first configuration and the actuator 702 may be positioned in the first position. For example, the electric motor 704 may be actuated to drive the actuator 702 to the first position through the leadscrew 786 to push the first flange 750 towards the lock cylinder 710. In embodiments, the actuator 702 may push the first flange 750 against the end surface 772 of the guide 766, such as sandwiching the first flange 750 between the end surface 772 and the end wall 774 of the actuator 702. In the second state, the latch 700 may be prevented from unlocking to add further security compared to the first state.

FIG. 9 illustrates the lock assembly 602 in a third state. The third state may be an unlock state of the lock assembly 602. In the third state, the actuator 702 may be positioned in the second position and the latch 700 may be positioned in the second configuration. The electric motor 704 may be actuated to drive the actuator 702 to the second position through the leadscrew 786 to pull the latch 700 away from the lock cylinder 710. For example, driving the actuator 702 to the second position may engage the end wall 774 of the actuator 702 with the second flange 754 of the latch 700 to pull the latch 700 to the second configuration against the bias of the spring 760. The latch 700 may be pulled into the cavity 708 of the housing 706 until the latch 700 clears the groove 728 disposed in the locking pin 614, whereupon the locking pin 614 may be removed from the lock cylinder 710.

FIGS. 10A-12C illustrate diagrams of different sensor arrangements to determine states of three moving components of the locking assembly for a working module. For example, a first sensor may determine states of the actuator 702, a second sensor may determine states of the latch 700, and a third sensor may determine states of the locking pin 614, although other configurations are contemplated. The sensors may facilitate locking or unlocking of the lock assembly 602 and determine one or more failures or faults.

Figure 10A:
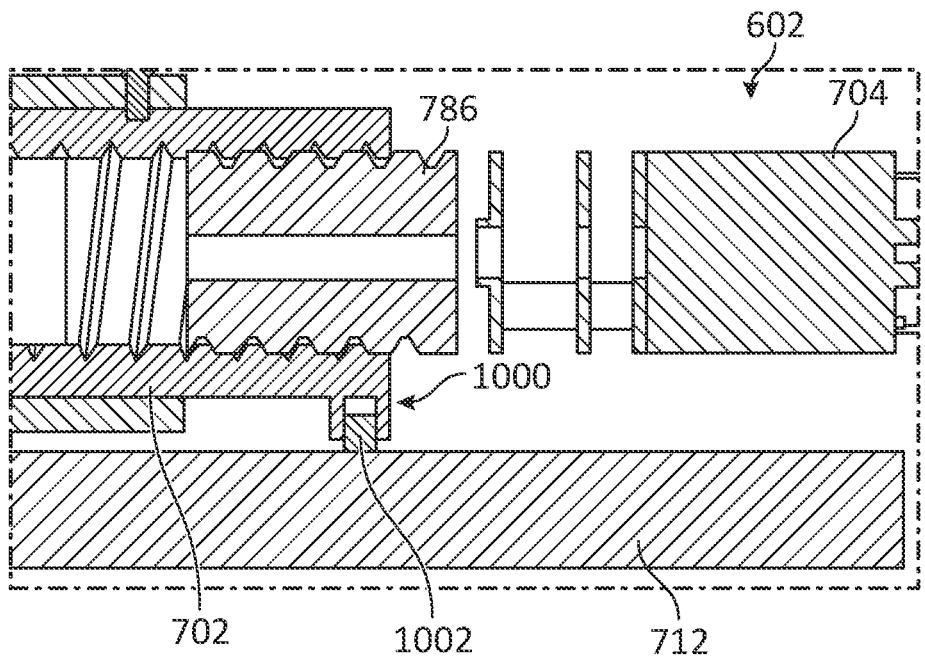
FIGS. 10A-10D illustrate diagrams of different sensor arrangements for sensing a position of an actuator, in accordance with an embodiment of the disclosure.
Figure 10B:
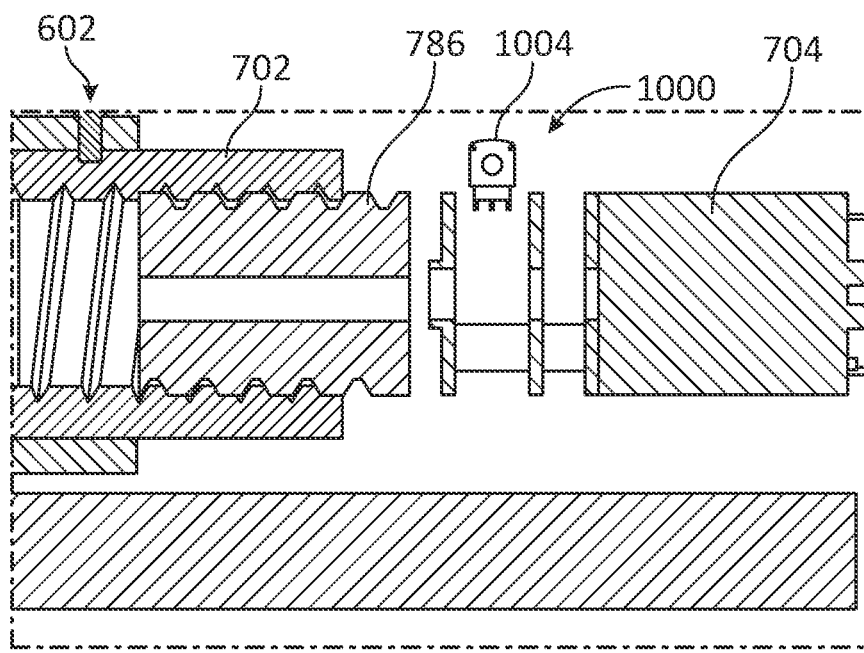
Figure 10C:
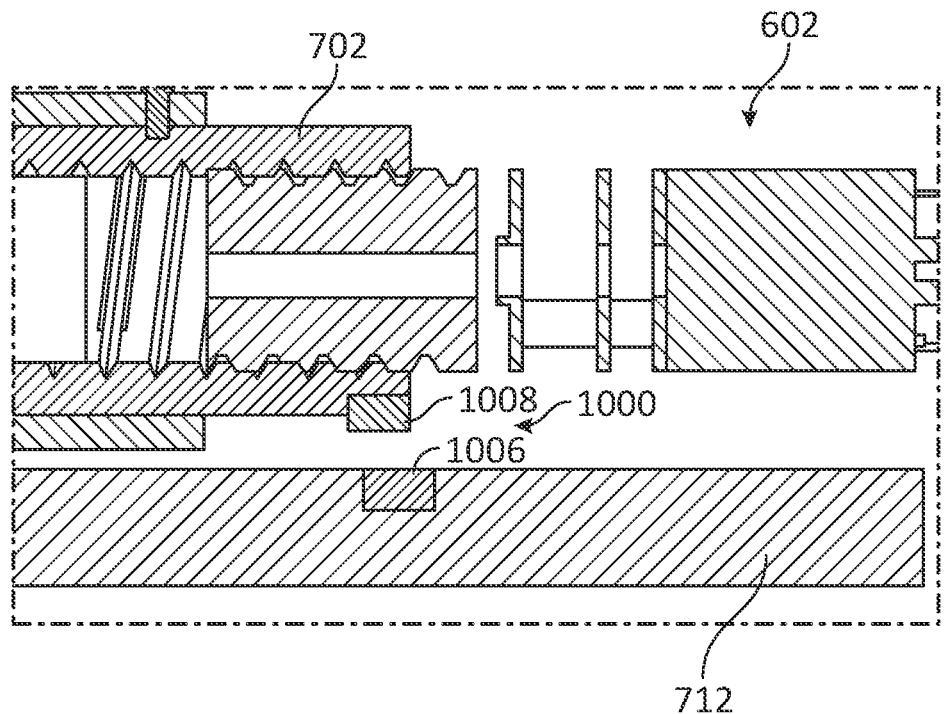
Figure 10D:
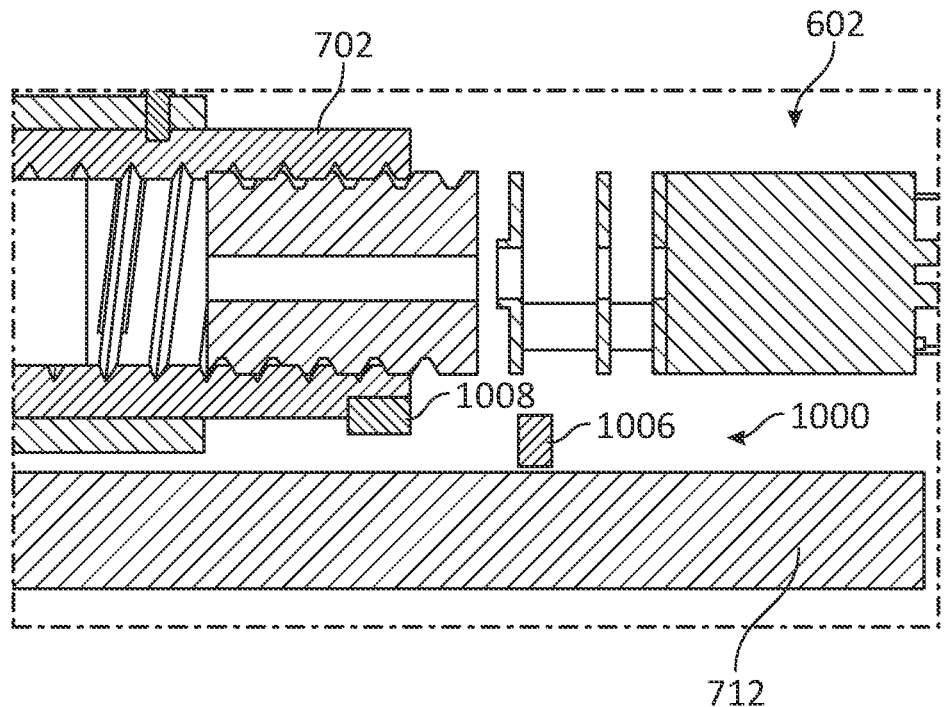

FIGS. 10A-10D illustrate diagrams of different sensor arrangements for sensing a position of the actuator 702, in accordance with an embodiment of the disclosure. FIG. 10A illustrates a potentiometer arrangement for sensing the position of the actuator 702, in accordance with an embodiment of the disclosure. FIG. 10B illustrates a rotary encoder arrangement for sensing the position of the actuator 702, in accordance with an embodiment of the disclosure. FIG. 10C illustrates a hall effect sensor arrangement for sensing the position of the actuator 702, in accordance with an embodiment of the disclosure. FIG. 10D illustrates an additional hall effect sensor arrangement for sensing the position of the actuator 702, in accordance with an embodiment of the disclosure.

Referring to FIGS. 10A-10D, the lock assembly 602 may include a first sensor 1000 configured to detect a position of the actuator 702. The first sensor 1000 may include many configurations to detect the position of the actuator 702. For example, the first sensor 1000 may be associated with the actuator 702, electric motor 704, or leadscrew 786 (or any combination thereof) to determine the position of the actuator 702 based on detected movement of the actuator 702, electric motor 704, and/or leadscrew 786. Depending on the application, the first sensor 1000 may detect linear and/or rotary movement of the actuator 702, electric motor 704, or leadscrew 786. Referring to FIG. 10A, the first sensor 1000 may include one or more potentiometers, such as any combination of sliding linear, flex membrane, or other potentiometers. As shown, the first sensor 1000 may be a sliding linear potentiometer 1002 secured to the PCBA 712 and coupled to the actuator 702. As the actuator 702 moves between positions, the actuator 702 may reconfigure (e.g., move) the potentiometer 1002 to vary one or more outputs of the potentiometer 1002 to determine movement of the actuator 702. Referring to FIG. 10B, the first sensor 1000 may include one or more rotary encoders 1004 associated with the electric motor 704 or leadscrew 786. In such embodiments, the rotary encoder may detect the rotation of the electric motor 704 or leadscrew 786 to determine movement of the actuator 702.

Referring to FIGS. 10C and 10D, the first sensor 1000 may include one or more hall effect sensors 1006. As shown, the hall effect sensor 1006 may be disposed in or attached to the PCBA 712. The actuator 702 may include a magnet 1008. The output of the hall effect sensor 1006 may vary based on the position of the magnet 1008 relative to the hall effect sensor 1006. As shown in FIG. 10C, the hall effect sensor 1006 may be disposed below the magnet 1008 to detect movement of the magnet 1008 above the hall effect sensor 1006. As shown in FIG. 10D, the hall effect sensor 1006 may be disposed to the side of the magnet 1008 to detect movement of the magnet 1008 towards and away from the hall effect sensor 1006. Such configurations are illustrative only, and other configurations are contemplated.

Figure 11A:
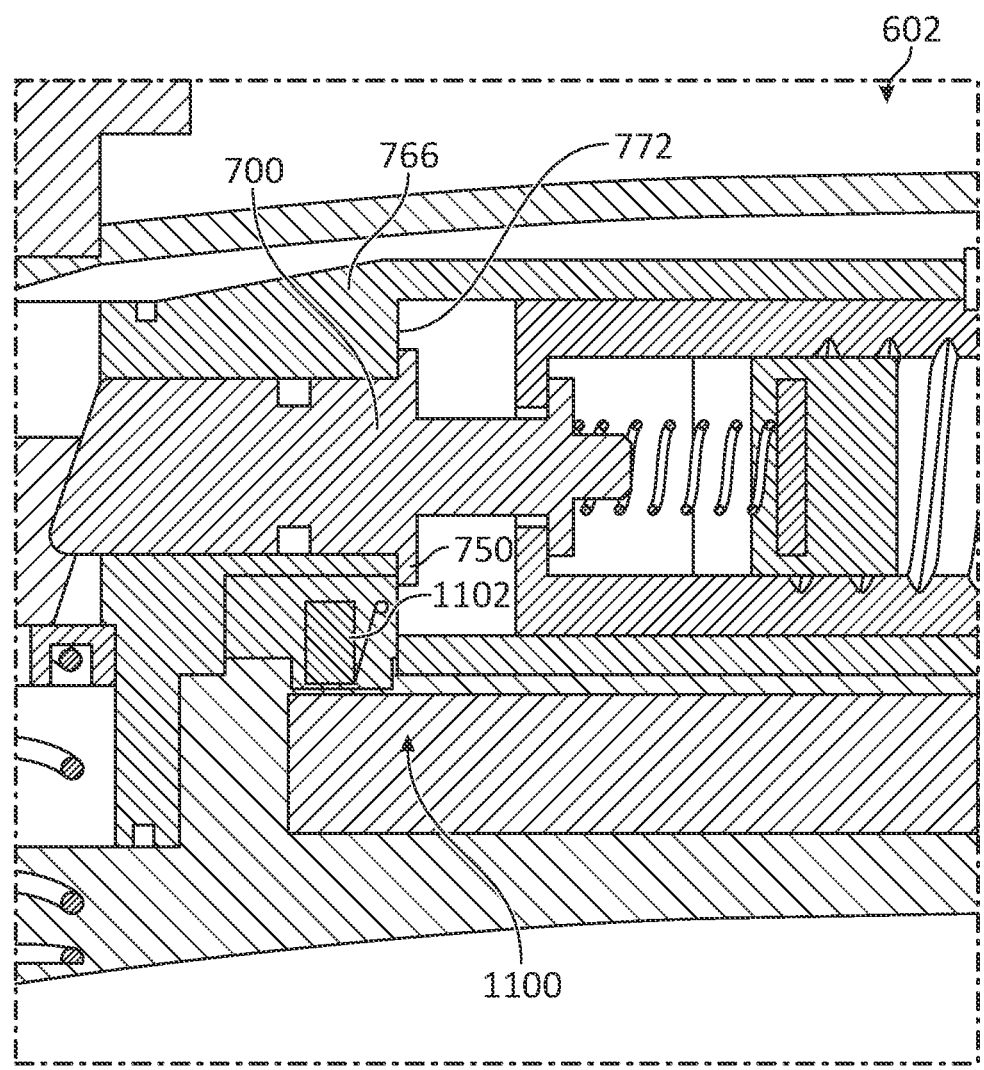
FIGS. 11A-11E illustrate diagrams different sensor arrangements for sensing a position of a latch, in accordance with an embodiment of the disclosure.
Figure 11B:
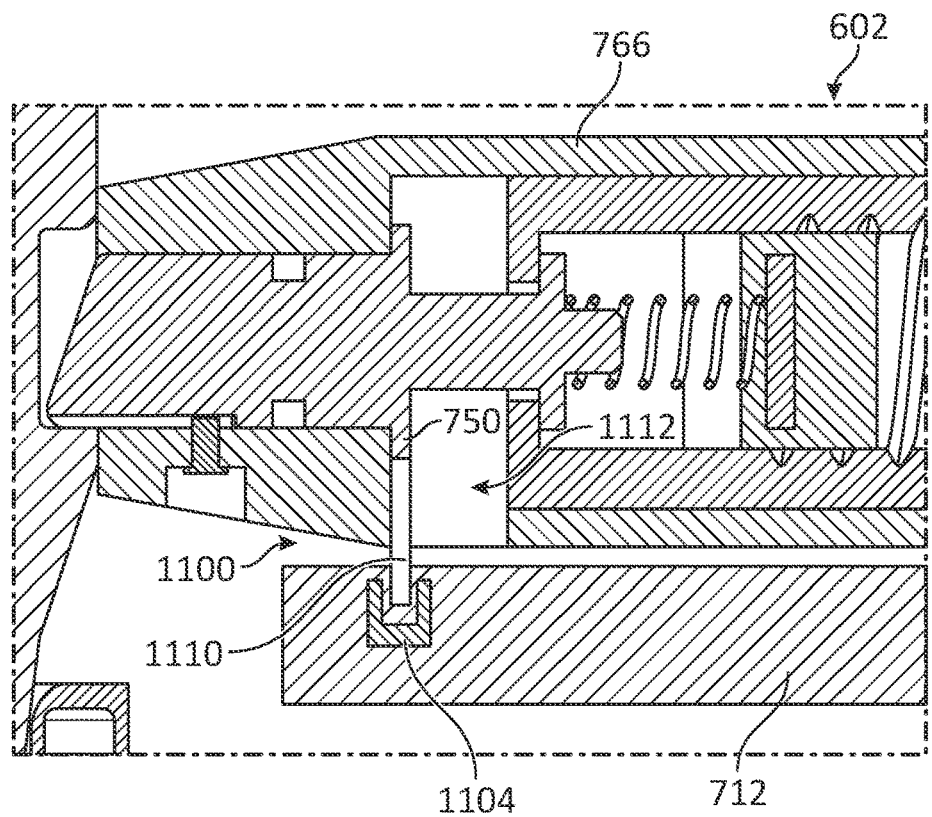
Figure 11C:
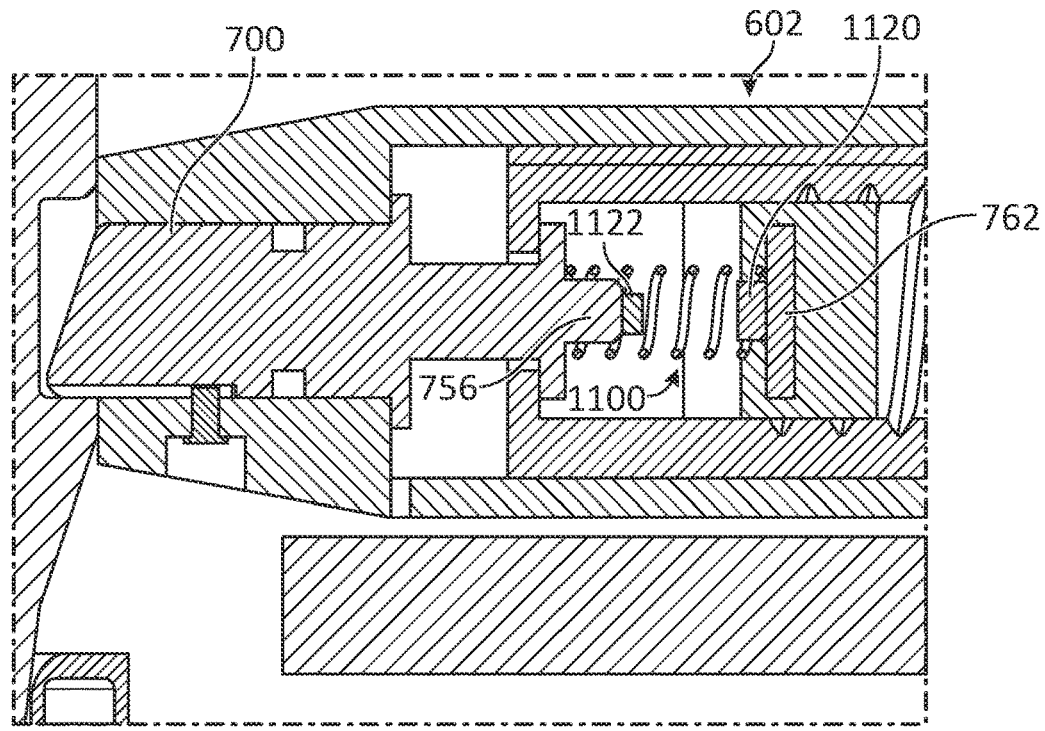
Figure 11D:
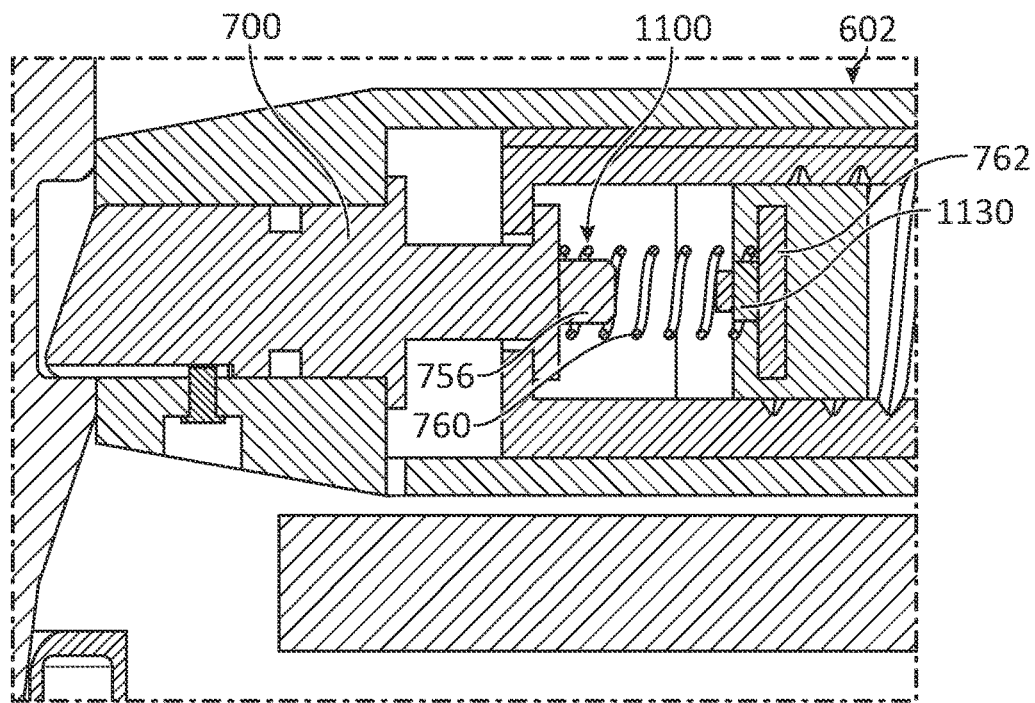
Figure 11E:
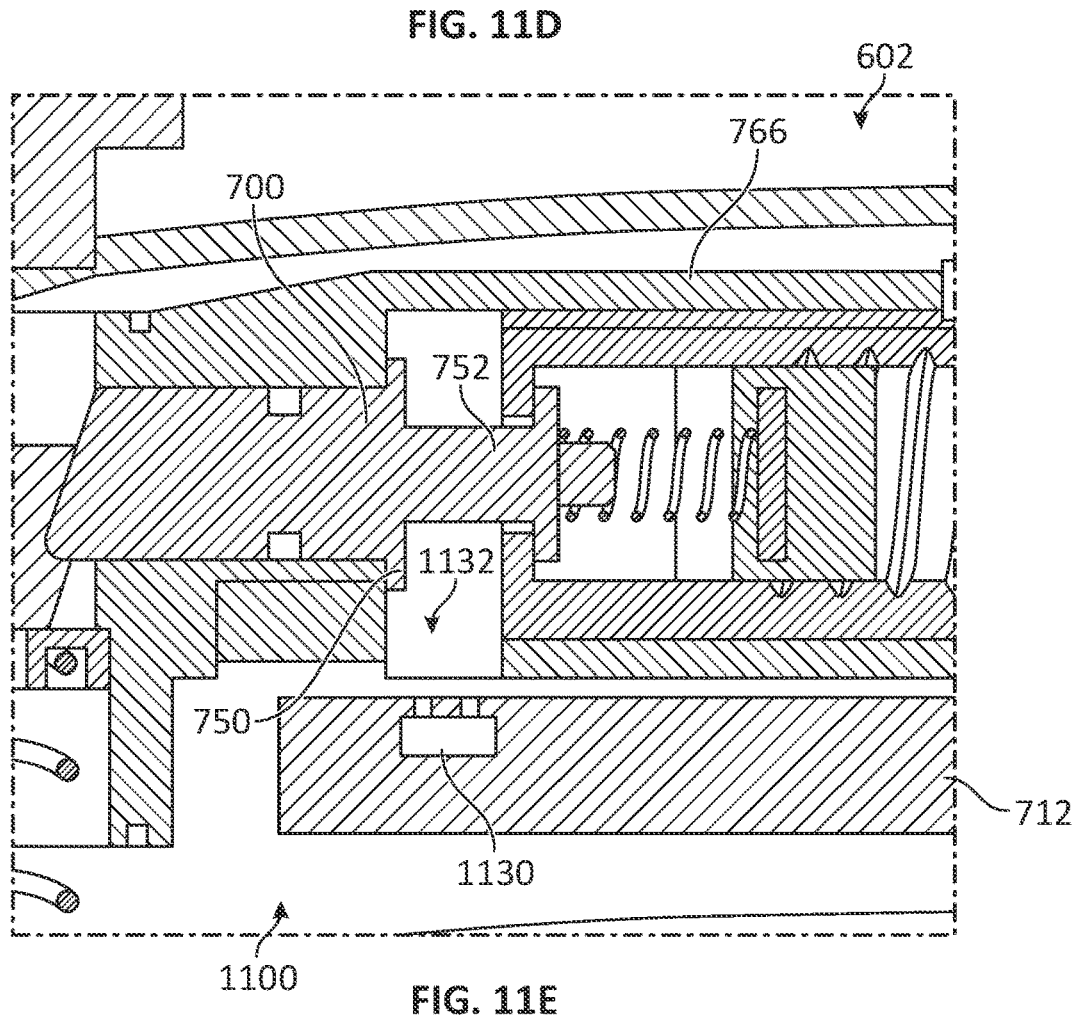

FIGS. 11A-11E illustrate diagrams different sensor arrangements for sensing a position of a latch 700, in accordance with an embodiment of the disclosure. FIG. 11A illustrates a contact switch arrangement for sensing the position of the latch 700, in accordance with an embodiment of the disclosure. FIG. 11B illustrates a photointerrupter sensor arrangement for sensing the position of the latch 700, in accordance with an embodiment of the disclosure. FIG. 11C illustrates a hall effect sensor arrangement for sensing the position of the latch 700, in accordance with an embodiment of the disclosure. FIG. 11D illustrates an infrared sensor arrangement for sensing the position of the latch 700, in accordance with an embodiment of the disclosure. FIG. 11E illustrates an additional infrared sensor arrangement for sensing the position of the latch 700, in accordance with an embodiment of the disclosure.

Referring to FIGS. 11A-11E, the lock assembly 602 may include a second sensor 1100 configured to detect a configuration of the latch 700. The second sensor 1100 may be associated with the latch 700, actuator 702, guide 766, PCBA 712, or other component of the lock assembly 602 (or any combination thereof) to determine the position of the latch 700 based on a detected condition of the latch 700. Referring to FIG. 11A, the second sensor 1100 may include a contact switch 1102. For example, the contact switch 1102 may detect contact of the latch 700 with the guide 766, such as contact of the first flange 750 of the latch 700 with the end surface 772 of the guide 766. Referring to FIG. 11B, the second sensor 1100 may include a photointerrupter 1104. As shown, the photointerrupter 1104 may be coupled to the PCBA 712, with the first flange 750, or an extension 1110 extending from the first flange 750, extending through a cutout 1112 defined in the guide 766 above the photointerrupter 1104. The photointerrupter 1104 may detect light blockage when the first flange 750 or extension 1110 is positioned between a light emitting element and a light receiving element. Referring to FIG. 11C, the second sensor 1100 may include a hall effect sensor 1120. As shown, the hall effect sensor 1120 may be positioned at the ledge 762, such as within the spring 760, with the post 756 of the latch 700 including a magnet 1122. The hall effect sensor 1120 may detect movement of the magnet 1122 relative to the ledge 762.

Referring to FIGS. 11D and 11E, the second sensor 1100 may include an infrared sensor 1130. Referring to FIG. 11D, the infrared sensor 1130 may be positioned at the ledge 762 to detect movement of the latch 700 towards the ledge 762. For example, the infrared sensor 1130 may be positioned within the spring 760 to detect movement of the post 756 towards the ledge 762. Referring to FIG. 11E, the infrared sensor 1130 may be coupled to the PCBA 712 and directed towards the latch 700 through a cutout 1132 disposed in the guide 766. In such configurations, the infrared sensor 1130 may detect movement of the rod 752 and/or first flange 750. Such configurations are illustrative only, and other configurations are contemplated.

Figure 12C:
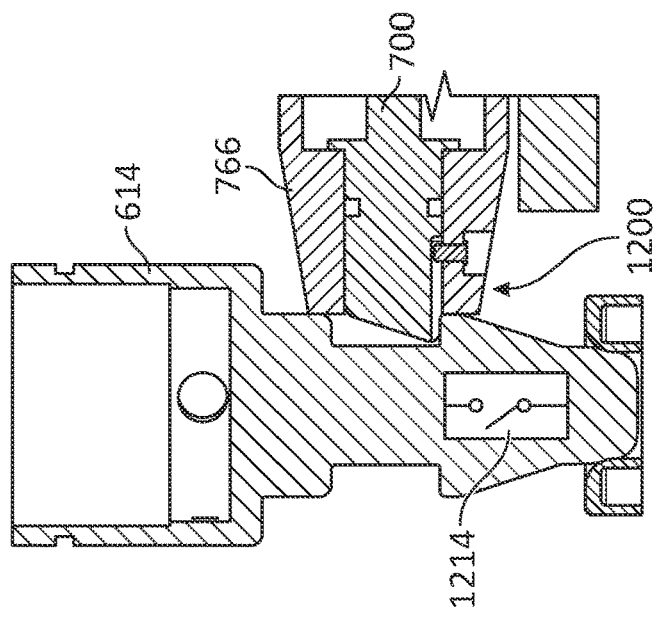
FIGS. 12A-12C illustrate diagrams of different sensor arrangements for sensing a position of a locking pin, in accordance with an embodiment of the disclosure.
Figure 12B:
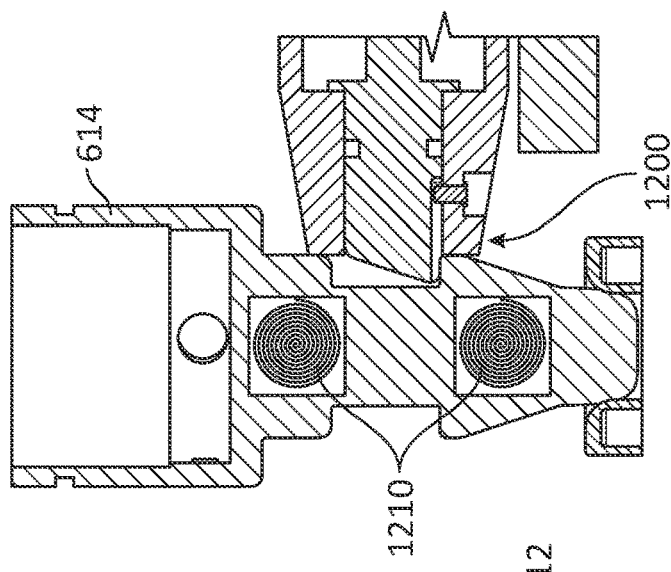
Figure 12A:
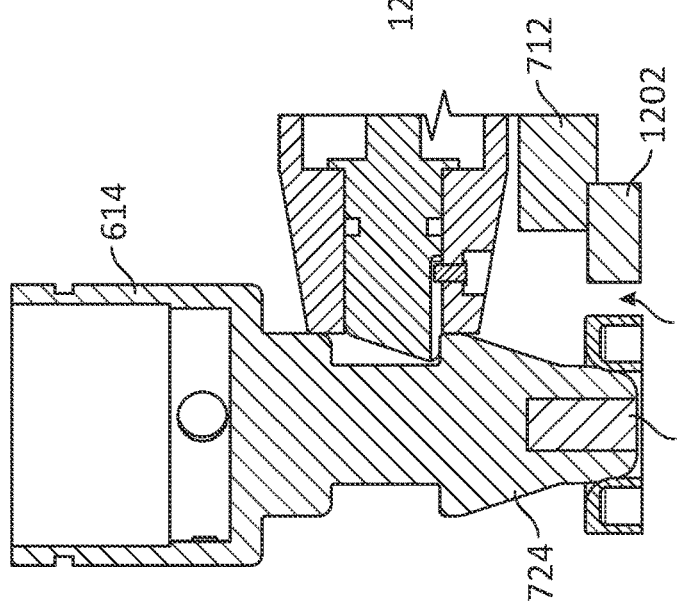

FIGS. 12A-12C illustrate diagrams of different sensor arrangements for sensing a position of the locking pin 614, in accordance with an embodiment of the disclosure. FIG. 12A illustrates a magnetic sensor arrangement for sensing the position of the locking pin 614, in accordance with an embodiment of the disclosure. FIG. 12B illustrates an inductive sensor arrangement for sensing the position of the locking pin 614, in accordance with an embodiment of the disclosure. FIG. 12C illustrates a contact switch arrangement for sensing the position of the locking pin 614, in accordance with an embodiment of the disclosure.

Referring to FIGS. 12A-12C, the lock assembly 602 may include a third sensor 1200 configured to detect the locking pin 614 inserted into the lock assembly 602. The third sensor 1200 may be associated with the locking pin 614, latch 700, PCBA 712, or other component of the lock assembly 602 (or any combination thereof) to determine the position of the locking pin 614. Referring to FIG. 12A, the third sensor 1200 may include a magnetic sensor, such as a hall effect sensor 1202. The hall effect sensor 1202 may be positioned at the PCBA 712, with the tip 724 of the locking pin 614 including a magnet 1204. In such embodiments, the hall effect sensor 1202 may detect when the tip 724 (and magnet 1204) is seated at the bottom of the lock cylinder 710. Referring to FIG. 12B, the third sensor 1200 may include an inductive sensor 1210. The inductive sensor 1210 may detect an interaction of the locking pin 614 with a magnetic field. Referring to FIG. 12C, the third sensor 1200 may include a contact switch 1214 that detects contact of the locking pin 614 with the latch 700, guide 766, or bottom of the lock cylinder 710, for example.

Figure 13:
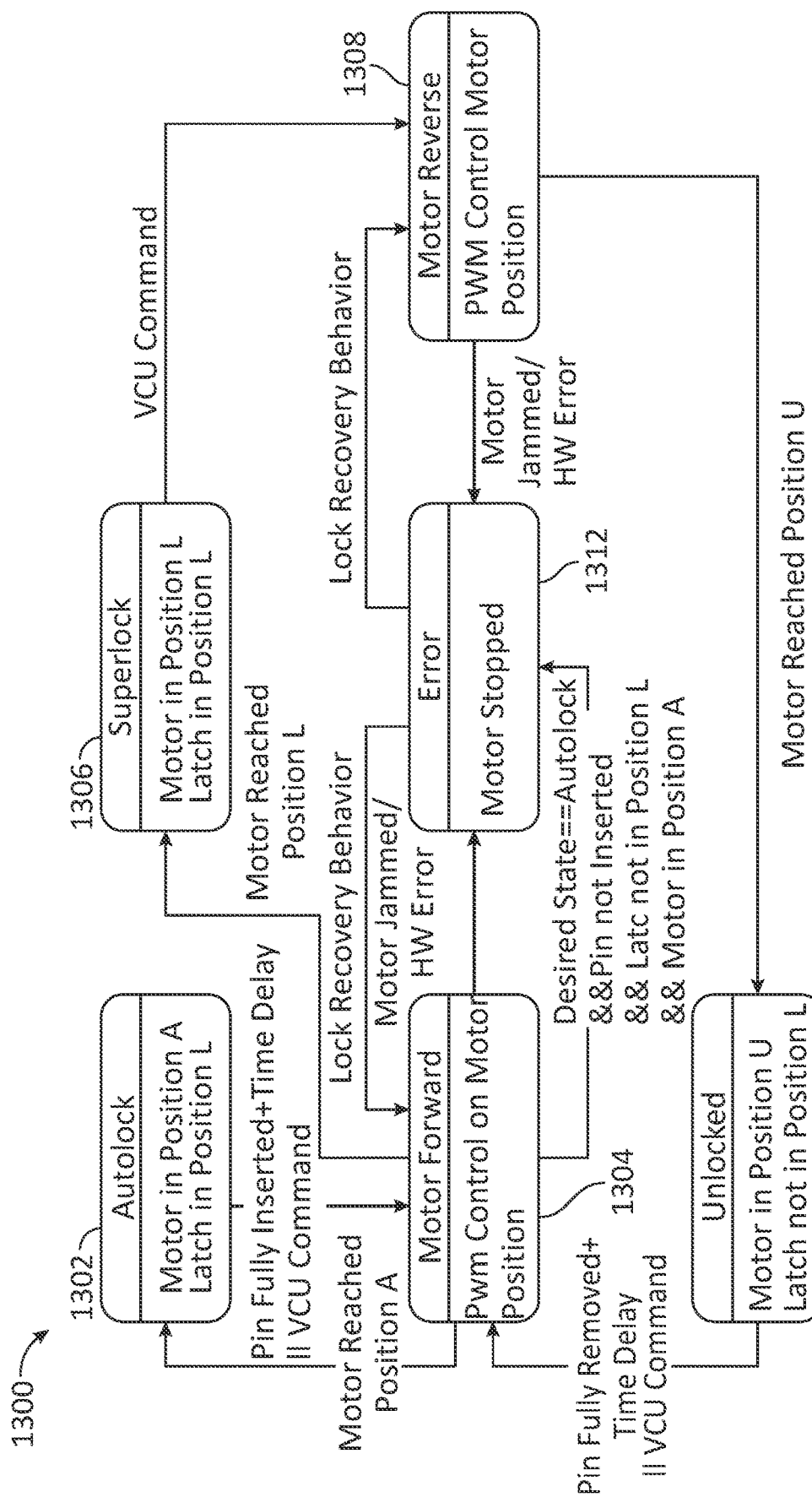
FIG. 13 illustrates a diagram of a state machine associated with the lock assembly of FIGS. 7-9, in accordance with an embodiment of the disclosure.

FIG. 13 illustrates a diagram of a state machine 1300, in accordance with an embodiment of the disclosure. The state machine 1300 may be associated with the lock assembly 602 to perform a predetermined sequence of actions depending on a sequence of events with which they are presented. State machine 1300 may be operated by controller 800 based on one or more sensor signals received by the controller 800 (e.g., from first sensor 1000, second sensor 1100, third sensor 1200, other sensors, or any combination thereof). For example, the signals received from first sensor 1000, second sensor 1100, and/or third sensor 1200 (or other sensors) may trigger the state machine 1300 to move to a different state, as discussed herein.

Referring to FIG. 13, the state machine 1300 includes a plurality of possible states, with each state represented by a node and arrows showing the transitions from one state to another. The state machine 1300 may represent the actions and states of the lock assembly 602 during locking or unlocking of the lock assembly 602. For example, node 1302 represents the autolock state of the lock assembly 602, with the actuator 702 in the third position and the latch 700 in the first configuration. Node 1302 may represent the configuration of the lock assembly 602 shown in FIG. 7 and described above. For example, node 1302 may represent the state of the lock to receive the locking pin 614 in the lock cylinder 710. Once the locking pin 614 is inserted, the latch 700 may autolock to the locking pin 614, as described above.

Node 1304 represents a motor forward state. The lock assembly 602 may transition from node 1302 to node 1304 when the locking pin 614 is fully inserted, such as determined through the sensor arrangements illustrated in FIGS. 12A-12C. In embodiments, a transition to node 1304 from node 1302 may occur after a predetermined time delay, such as after a threshold time after full insertion of the locking pin 614. The transition to node 1304 may occur in response to a command received from a vehicle control unit (VCU). In node 1304, the electric motor 704 may be advanced to move the actuator 702 towards the lock cylinder 710. For example, the electric motor 704 may drive the actuator 702 towards the lock cylinder 710 through leadscrew 786, as described above.

Node 1306 represents the super-lock state of the lock assembly 602, with the actuator 702 in the first position and the latch 700 in the first configuration. Node 1306 may represent the configuration of the lock assembly 602 illustrated in FIG. 8 and described above. The lock assembly 602 may transition from node 1304 to node 1306 when the actuator 702 has reached the first position, such as determined through the sensor arrangements illustrated in FIGS. 10A-10D. Once the actuator 702 is in the first position, the electric motor 704 may be stopped. In node 1306, the latch 700 may be prevented from unlocking to add further security compared to node 1302.

Node 1308 represents a motor reverse state. The lock assembly 602 may transition from node 1306 to node 1308 with a VCU command. For example, the lock assembly 602 may transition out of node 1306 when unlocking the lock assembly 602 is desired, such as at the request of a rider or management server. In node 1308, the electric motor 704 may be reversed to move the actuator 702 away from the lock cylinder 710. For example, the electric motor 704 may drive the actuator 702 away from the lock cylinder 710 through leadscrew 786, as described above.

Node 1310 represents the unlock state of the lock assembly 602, with the actuator 702 in the second position and the latch 700 not in the first configuration (e.g., in the second configuration). Node 1310 may represent the configuration of the lock assembly 602 shown in FIG. 9 and described above. The lock assembly 602 may transition from node 1308 to node 1310 when the actuator 702 has reached the second position, such as determined through the sensor arrangements illustrated in FIGS. 10A-10D. Once the actuator 702 is in the second position, the electric motor 704 may be stopped. In node 1310, the latch 700 may be disengaged from the locking pin 614, such that the locking pin 614 is removable from the lock cylinder 710.

As shown, the lock assembly 602 may transition from node 1310 to node 1304 when certain conditions are met. For example, the lock assembly 602 may transition from node 1310 to node 1304 when the locking pin 614 is fully removed, such as determined through the sensor arrangements illustrated in FIGS. 12A-12C. A transition to node 1304 from node 1310 may occur after a predetermined time delay, such as after a threshold time after removal of the locking pin 614 from the lock cylinder 710. In some embodiments, the transition to node 1304 from node 1310 may occur in response to a VCU command. In node 1304, the electric motor 704 may be advanced to move the actuator 702 from the second position to the third position. Once the actuator 702 reaches the third position, the lock assembly 602 may transition back to node 1302.

The state machine 1300 may include other states and transitions. For example, the state machine 1300 may include an error loop. As shown, state machine 1300 includes node 1312. Node 1312 represents an error state. In node 1312, the electric motor 704 may be stopped when an error is detected, and the lock assembly 602 may transition to either node 1304 or node 1308 to correct the error. For example, during electric motor advancement in node 1304, the motor may jam, the locking pin 614 may not be inserted, the latch 700 may not be in the first configuration, or the actuator 702 may already be in the first configuration, among other undesired states, conditions, or configurations for electric motor advancement. Similarly, during electric motor reversal in node 1308, the motor may jam, or the actuator 702 may be in the second position, among other undesired states, conditions, or configurations for electric motor reversal. If such conditions are detected, the lock assembly 602 may undergo lock recovery behavior. For example, if the motor jams during advancement, the lock assembly 602 may transition to node 1308 to reverse the electric motor 704. In like manner, if the motor jams during reversal, the lock assembly 602 may transition to node 1304 to advance the electric motor 704. Similarly, if any conditions are not met for motor advancement or reversal, the lock assembly 602 may reverse or advance the electric motor 704 as appropriate. Additional faults or errors may include sensed electrical failures; jammed latch, actuator, or electric motor; loss of control command; change of control command during lock movement; hardware faults; unexpected power loss; FMEA faults; and the like.

Figure 14:
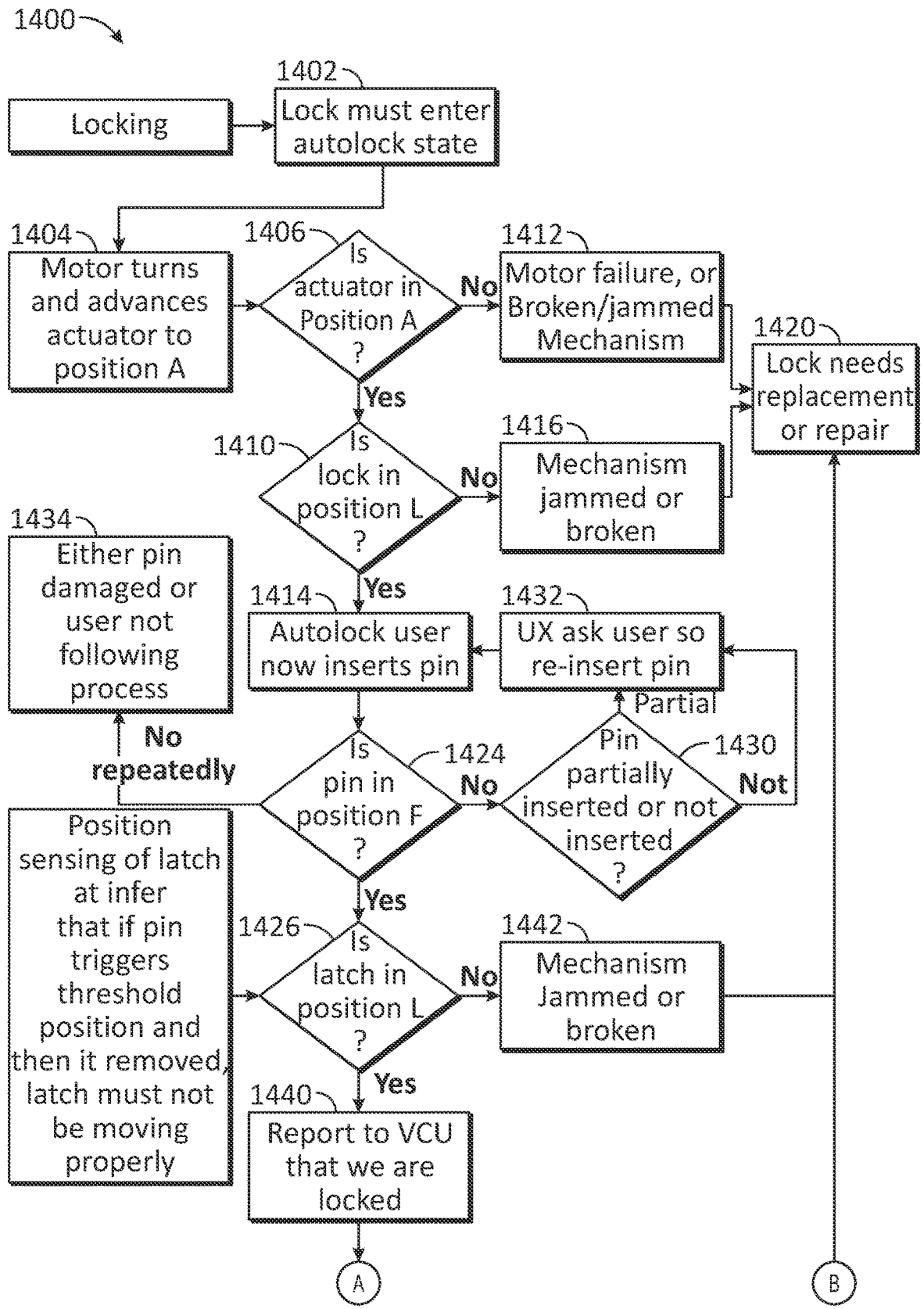
FIG. 14 illustrates a flow diagram of a process of locking a lock assembly, in accordance with an embodiment of the disclosure.
Figure 14:
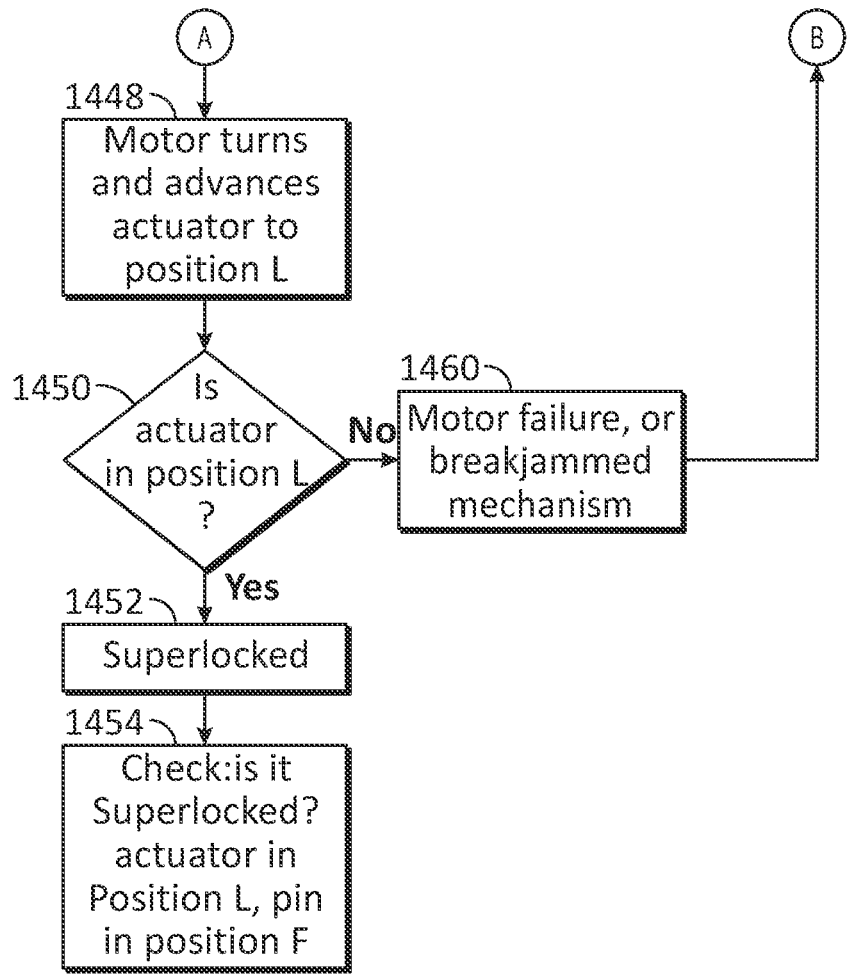

FIG. 14 illustrates a flow diagram of a process 1400 of locking a lock assembly, in accordance with an embodiment of the disclosure. The lock assembly may be similar to lock assembly 602, described above. For example, the lock assembly may include a lock and a locking pin securable to the lock to secure a micromobility transit vehicle. The lock assembly may include a latch, an actuator, a leadscrew, and an electric motor, such as those described above. It should be appreciated that any step, sub-step, sub-process, or block of process 1400 may be performed in an order or arrangement different from the embodiments illustrated by FIG. 14. For example, one or more blocks may be omitted from or added to the process 1400. Although process 1400 is described with reference to the embodiments of FIGS. 1-13, process 1400 may be applied to other embodiments.

In block 1402, process 1400 may begin with determining the lock assembly must enter an autolock state. For example, if the locking pin of the lock assembly is disengaged from the lock, it may be desirable to place the lock assembly in the autolock state, such that the lock assembly enables user actuated movement of the latch during locking. Block 1402 may include determining the lock assembly is not in the autolock state. For example, one or more sensors may be used to determine the position of the latch and actuator, as described above. The autolock state may be similar to the configuration shown in FIG. 7, described above.

In block 1404, process 1400 may include advancing the actuator to an autolock position. For example, the electric motor may drive the actuator to the autolock position through leadscrew. In embodiments, the autolock position may be the third position, described above. In block 1406, process 1400 may include determining the actuator is in the autolock position. Block 1406 may include determining the position of the actuator using one or more sensors attached to or associated with the actuator, such as the first sensor 1000 described above. Block 1406 may produce a binary result, either determining the actuator is in the autolock position or not in the autolock position.

If block 1406 determines the actuator is in the autolock position, process 1400 may proceed to block 1410. Block 1410 may include determining the latch is in a locking position, such as via one or more sensors (e.g., second sensor 1100). Block 1410 may produce a binary result, either determining the latch is in the locking position or not in the locking position. The locking position may be the first configuration described above. If block 1406 determines the actuator is not in the autolock position, process 1400 may proceed to block 1412. Block 1412 may include a determination of motor failure or a broken/jammed mechanism.

If block 1410 determines the latch is in the locking position, process 1400 may proceed to block 1414. Block 1414 may include a determination that the lock assembly is autolocked, allowing a user to insert the locking pin into the lock cylinder. If block 1410 determines the latch is not in the locking position (e.g., the latch is in the second configuration), process 1400 may proceed to block 1416. Block 1416 may include a determination of a jammed or broken mechanism. If process 1400 proceeds to either block 1412 or block 1416, process 1400 may include a determination that the lock needs replacement or repair (block 1420).

In block 1424, process 1400 may include determining the locking pin is fully inserted. Full insertion of the locking pin may be the position of the locking pin at or near position F shown in FIGS. 7-9. Block 1424 may include determining the position of the locking pin using one or more sensors, such as the third sensor 1200 described above. Block 1424 may produce a binary result, either determining the locking pin is fully-inserted or not fully-inserted. If block 1424 determines the locking pin is fully inserted, process 1400 may proceed to block 1426. Block 1426 may include determining the latch is in the locking position. For example, after insertion of the locking pin within the lock cylinder, process 1400 may check whether the latch has engaged locking pin, as evidenced by the locking pin snapping back into the locking position. Block 1426 may use position sensing of the latch or may infer that if the locking pin triggers a threshold position and then is removed, the latch must not be moving properly.

If block 1424 determines the locking pin is not fully inserted, process 1400 may proceed to block 1430. Block 1430 may include determining the locking pin is partially inserted or not inserted. Partial insertion of the locking pin may be the position of the locking pin at or near position P illustrated in FIGS. 7-9. Removal or non-insertion of the locking pin may be the position of the locking pin at or near position N shown in FIGS. 7-9. If a determination is made that the locking pin is partially inserted or not inserted into the lock cylinder, process 1400 may proceed to block 1432. Block 1432 may request the user to reinsert the locking pin. For example, a request may be sent to a user interface, such as to the user's mobile device. Process 1400 may then proceed back to block 1414. If after repeated attempts to reinsert the locking pin, process 1400 may proceed to block 1434. In block 1434, a determination may be made that either the locking pin is damaged or that the user is not following the process correctly.

If block 1426 determines the latch is in the locking position, process 1400 may proceed to block 1440. In block 1440, process 1400 may report to a vehicle control unit (VCU) that the locking assembly is locked. If block 1426 determines the latch is not in the locking position (e.g., the latch is in the second configuration), process 1400 may proceed to block 1442. Block 1442 may include a determination of a jammed or broken mechanism. If process 1400 proceeds to block 1442, process 1400 may include a determination that the lock needs replacement or repair, such as at block 1420.

In block 1448, process 1400 may include advancing the actuator to a locked position. For example, the electric motor may drive the actuator to the locked position through leadscrew. The locked position may be the first position, described above. The locked position may be similar to the configuration shown in FIG. 8. In block 1450, process 1400 may include determining the actuator is in the locked position, such as via one or more sensors (e.g., the first sensor 1000). Block 1450 may produce a binary result, either determining the actuator is in the locked position or not in the locked position.

If block 1450 determines the actuator is in the locked position, process 1400 may proceed to block 1452. Block 1452 may include a determination that the lock assembly is superlocked. In block 1454, process 1400 may include verifying the lock assembly is superlocked. For example, block 1454 may include determining the latch is in the locking position and that the actuator is in the locked position. If block 1450 determines the actuator is not in the locked position, process 1400 may proceed to block 1460. Block 1460 may include a determination of motor failure or a broken/jammed mechanism. If process 1400 proceeds to block 1460, process 1400 may include a determination that the lock needs replacement or repair, such as at block 1420.

Figure 15:
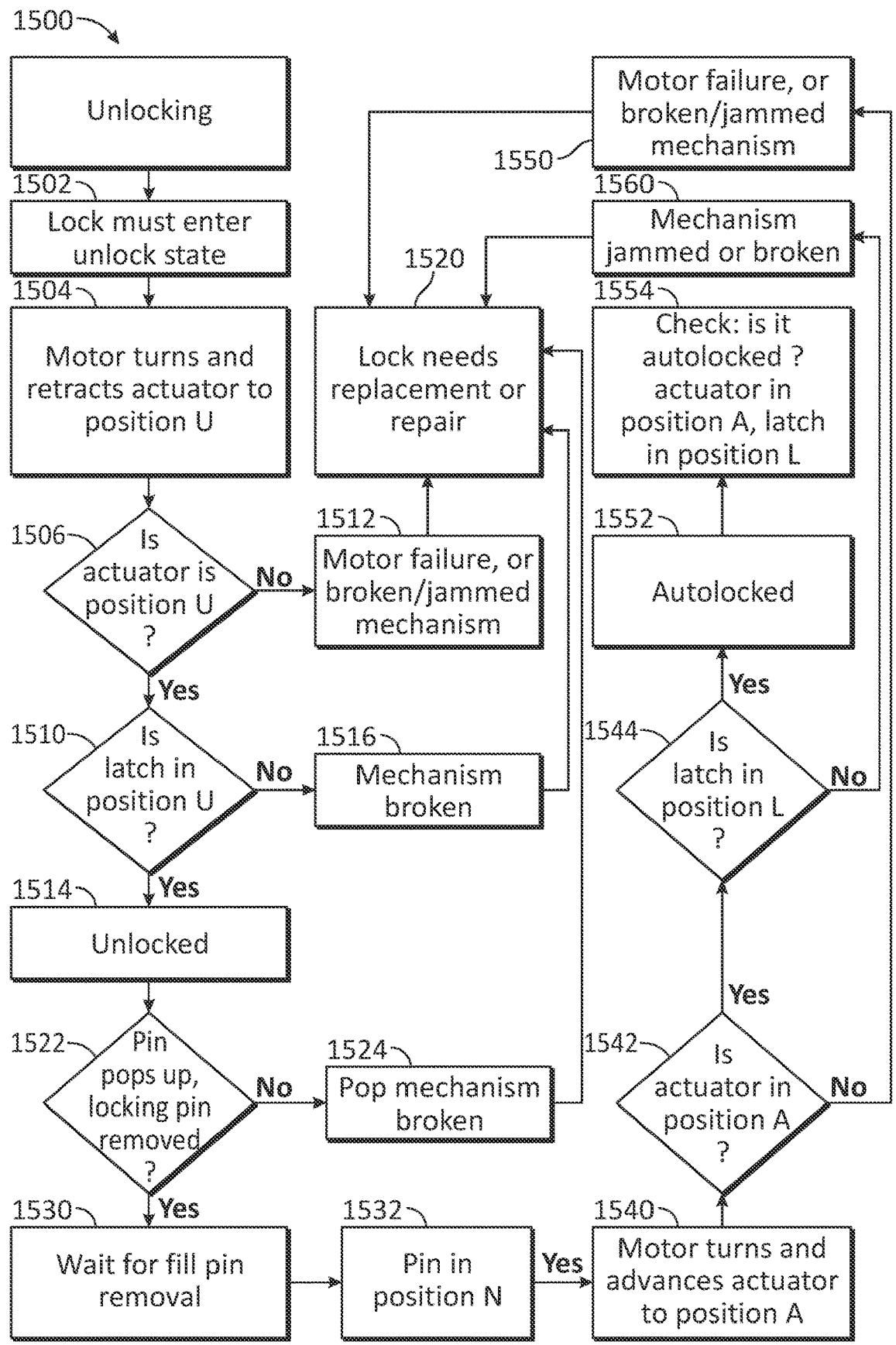
FIG. 15 illustrates a flow diagram of a process of unlocking a lock assembly, in accordance with an embodiment of the disclosure.

FIG. 15 illustrates a flow diagram of a process 1500 of unlocking a lock assembly, in accordance with an embodiment of the disclosure. The lock assembly may be similar to lock assembly 602, described above. For example, the lock assembly may include a lock and a locking pin securable to the lock to lock a micromobility transit vehicle. The lock assembly may include a latch, an actuator, a leadscrew, and an electric motor, such as those described above. It should be appreciated that any step, sub-step, sub-process, or block of process 1500 may be performed in an order or arrangement different from the embodiments illustrated by FIG. 15. For example, one or more blocks may be omitted from or added to the process 1500. Although process 1500 is described with reference to the embodiments of FIGS. 1-13, process 1500 may be applied to other embodiments.

In block 1502, process 1500 may begin with determining the lock assembly must enter an unlock state. For example, if the lock assembly is to be unlocked, such as to unlock a micromobility transit vehicle for use, it may be desirable to place the lock assembly in the unlock state, such that the locking pin may be removed from the lock. Block 1502 may include determining the lock assembly is not in the unlock state. For example, one or more sensors may be used to determine the position of the latch and actuator, as described above. The unlock state may be similar to the configuration shown in FIG. 9, described above.

In block 1504, process 1500 may include retracting the actuator to an unlock position. For example, the electric motor may retract the actuator to the unlock position through leadscrew. In embodiments, the unlock position may be the second position, described above. In block 1506, process 1500 may include determining the actuator is in the unlock position. Block 1506 may include determining the position of the actuator using one or more sensors attached to or associated with the actuator, such as the first sensor 1000 described above. Block 1506 may produce a binary result, either determining the actuator is in the unlock position or not in the unlock position.

If block 1506 determines the actuator is in the unlock position, process 1500 may proceed to block 1510. Block 1510 may include determining the latch is in an unlocking position, such as via one or more sensors (e.g., second sensor 1100). Block 1510 may produce a binary result, either determining the latch is in the unlocking position or not in the unlocking position. The locking position may be the second configuration described above. If block 1506 determines the actuator is not in the unlock position, process 1500 may proceed to block 1512. Block 1512 may include a determination of motor failure or a broken/jammed mechanism.

If block 1510 determines the latch is in the unlocking position, process 1500 may proceed to block 1514. Block 1514 may include a determination that the lock assembly is unlocked, allowing a user to remove the locking pin from the lock cylinder. If block 1510 determines the latch is not in the unlocking position (e.g., the latch is in the first configuration), process 1500 may proceed to block 1516. Block 1516 may include a determination of a jammed or broken mechanism. If process 1500 proceeds to either block 1512 or block 1516, process 1500 may include a determination that the lock needs replacement or repair (block 1520).

In block 1522, process 1500 may include determining the locking pin is removed at least partially from the lock cylinder. Block 1522 may include determining the position of the locking pin using one or more sensors, such as the third sensor 1200 described above. Block 1522 may produce a binary result, either determining the locking pin is fully-inserted or not fully-inserted. If block 1522 determines the locking pin is still fully inserted, process 1500 may proceed to block 1524. Block 1524 may include determining the pop mechanism is broken. If process 1500 proceeds to block 1524, process 1500 may include a determination that the lock needs replacement or repair, such as at block 1520. If block 1522 determines the locking pin is not fully inserted (i.e., the locking pin has popped up at least partially), process 1500 may proceed to block 1530. Block 1530 may include waiting for full removal of the locking pin from the lock cylinder. In block 1532, process 1500 may include determining the locking pin is sufficiently (e.g., fully) removed from the lock cylinder.

When the locking pin is sufficiently (e.g., fully) removed from the lock cylinder, process 1500 may proceed to block 1540. Block 1540 may advance the actuator to an autolock position. For example, the electric motor may drive the actuator to the autolock position through leadscrew. The autolock position may be the third position, described above. The autolock position may be similar to the configuration shown in FIG. 7, described above. In block 1542, process 1500 may include determining the actuator is in the autolock position, such as via one or more sensors (e.g., the first sensor 1000). Block 1542 may produce a binary result, either determining the actuator is in the autolock position or not in the autolock position.

If block 1542 determines the actuator is in the autolock position, process 1500 may proceed to block 1544. Block 1544 may include determining the latch is in a locking position, such as via one or more sensors (e.g., second sensor 1100). Block 1544 may produce a binary result, either determining the latch is in the locking position or not in the locking position. The locking position may be the first configuration described above. If block 1542 determines the actuator is not in the autolock position, process 1500 may proceed to block 1550. Block 1550 may include a determination of motor failure or a broken/jammed mechanism. If process 1500 proceeds to block 1550, process 1500 may include a determination that the lock needs replacement or repair, such as at block 1520.

If block 1544 determines the latch is in the locking position, process 1500 may proceed to block 1552. Block 1552 may include a determination that the lock assembly is autolocked. In block 1554, process 1500 may include verifying the lock assembly is autolocked. For example, block 1554 may include determining the latch is in the locking position and that the actuator is in the autolock position. If block 1544 determines the latch is not in the locking position, process 1500 may proceed to block 1560. Block 1560 may include a determination of a broken or jammed mechanism. If process 1500 proceeds to block 1560, process 1500 may include a determination that the lock needs replacement or repair, such as at block 1520.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

Embodiments described above illustrate but do not limit the invention. It should also be understood that numerous modifications and variations are possible in accordance with the principles of the invention. Accordingly, the scope of the invention is defined only by the following claims.

What is claimed is:

1. A lock assembly comprising:
   a locking pin;
   a latch comprising an elongated member movable between a first configuration and a second configuration, the first configuration engaging the latch with the locking pin to secure the locking pin in place, the second configuration disengaging the latch from the locking pin;
   one or more stops configured to operatively engage with the latch to restrict a motion of the latch when the latch is in one or more of the first configuration or the second configuration;
   an electric motor; and
   an actuator operatively connected to the latch and linearly movable between a first position, a second position, and a third position based on operating the electric motor, wherein the electric motor is operatively connected to the actuator and configured to selectively move the actuator, and
   wherein the actuator is configured to:
      constrain the latch in the first configuration based on positioning the actuator at the first position;
      move the latch to the second configuration based on moving the actuator to the second position; and
      permit a predefined range of motion of the latch based on positioning the actuator at the third position, the predefined range of motion comprising a plurality of latch positions.

2. The lock assembly of claim 1, further comprising a leadscrew connected to the electric motor and threaded to the actuator, such that rotation of the leadscrew by the electric motor moves the actuator between positions.

3. The lock assembly of claim 1, further comprising a spring coupled to the latch and biasing the latch to the first configuration.

4. The lock assembly of claim 1, further comprising a pop mechanism engageable with the locking pin and configured to bias the locking pin out of a lock cylinder.

5. The lock assembly of claim 1, further comprising a spring coupled to the latch and biasing the latch to the first configuration, wherein:
   the first position pushes the actuator against a first portion of the latch to lock the lock assembly;
   the second position pulls the actuator against a second portion of the latch to unlock the lock assembly; and the third position of the actuator allows the latch to move between the first configuration and the second configuration to first accept and then lock a locking pin.

6. The lock assembly of claim 1, further comprising a guide, the latch and actuator slidable within the guide, wherein the actuator pushes the latch against the guide when in the first position or the second position.

7. The lock assembly of claim 1, further comprising:
a first sensor configured to detect a position of the actuator;
a second sensor configured to detect a configuration of the latch;
a third sensor configured to detect the locking pin inserted into the lock assembly; and
a fourth sensor configured to detect the locking pin inserted into a holster.

8. A micromobility transit vehicle comprising:
the lock assembly of claim 1;
a rear fender; and
a cable securable to the lock assembly and positionable along the rear fender and along the longitudinal axis of the micromobility transit vehicle to secure the cable when not in use.

9. The lock assembly of claim 1, where the plurality of latch positions includes a first latch position corresponding to the first configuration of the latch and a second latch position corresponding to the second configuration of the latch.

10. The lock assembly of claim 1, wherein the third position of the actuator is disposed between the first position of the actuator and the second position of the actuator.

11. A lock assembly comprising:
a locking pin;
a latch comprising an elongated member selectively engageable with the locking pin to secure the locking pin in place;
an actuator operatively connected to the latch and configured to secure the latch with the locking pin or disengage the latch from the locking pin, wherein the actuator is configured to be linearly movable to:
constrain the latch at a first latch position based on positioning the actuator at a first actuator position;
move the latch to a second latch position based on moving the actuator to a second actuator position; and
permit a predefined range of motion of the latch based on positioning the actuator at a third actuator position, the predefined range of motion comprising a plurality of latch positions;
an electric motor operatively connected to the actuator and configured to selectively move the actuator to cause securement of the latch with the locking pin or disengagement of the latch from the locking pin, and
one or more stops configured to operatively engage with the latch to restrict a motion of the latch when the latch is in one or more of a first configuration securing the locking pin in place or a second configuration disengaging the latch from the locking pin.

12. The lock assembly of claim 11, wherein the actuator is movable by the electric motor between the first actuator position securing engagement of the latch with the locking pin, the second actuator position disengaging the latch from the locking pin, and the third actuator position allowing the latch to auto-engage the locking pin.

13. A micromobility transit vehicle comprising:
a frame;
a cable comprising an end coupled to the frame and a locking pin; and
a lock configured to secure the locking pin of the cable, the lock comprising:
a lock cylinder configured to receive the locking pin of the cable;
a latch comprising an elongated member and movable between a locking configuration and an unlocking configuration, the locking configuration engaging the latch with the locking pin to secure the locking pin in place, the unlocking configuration disengaging the latch from the locking pin;
one or more stops configured to operatively engage with the latch to restrict a motion of the latch when the latch is in one or more of the locking configuration or the unlocking configuration;
an electric motor; and
an actuator operatively connected to the latch and linearly movable between a plurality of positions to move the latch between the locking configuration and the unlocking configuration based on operating the electric motor,
wherein the electric motor is operatively connected to the actuator and configured to selectively move the actuator, and
wherein the actuator is configured to:
constrain the latch in the locking configuration based on positioning the actuator at a first position of the plurality of positions;
move the latch to the unlocking configuration based on moving the actuator to a second position of the plurality of positions; and
permit a predefined range of motion of the latch based on positioning the actuator at a third position of the plurality of positions, the predefined range of motion comprising a plurality of latch positions.

14. The micromobility transit vehicle of claim 13, wherein:
the first position pushes a first flange of the latch towards the lock cylinder to limit movement of the latch to the unlocking configuration;
the second position pulls a second flange of the latch away from the lock cylinder to limit movement of the latch to the locking configuration.

15. The micromobility transit vehicle of claim 13, further comprising a leadscrew coupled to the electric motor and threaded to the actuator, such that rotation of the leadscrew by the electric motor moves the actuator between positions.

16. The micromobility transit vehicle of claim 13, further comprising a guide slidably receiving the latch and the actuator, wherein a gap disposed between the guide and the latch is configured to be narrower than a gap disposed between the actuator and the latch to limit one or more forces applied to the actuator by the latch caused by movement of the latch resulting from the locking pin pulling or pushing against the latch.

17. A method of changing a configuration of a lock assembly comprising a locking pin, a latch comprising an elongated member, an actuator coupled to the latch, and an electric motor operable to move the actuator between a plurality of positions, the method comprising:
permitting, via positioning the actuator at a predetermined position based on operating the electric motor, the latch to move within a predefined range of motion of the latch, the predefined range of motion comprising a plurality of latch positions; and one or more of:
- pushing, via the actuator, the latch towards a lock cylinder to secure the latch in a locking configuration; or
- pulling, via the actuator, the latch away from the lock cylinder to move the latch to an unlocking configuration, wherein one or more stops of the lock assembly operatively engage with the latch to restrict a motion of the latch when the latch is in one or more of the locking configuration or the unlocking configuration.

18. The method of claim 17, wherein pushing the latch towards the lock cylinder comprises driving the actuator towards the lock cylinder via rotational movement of a leadscrew threaded to the actuator and coupled to the electric motor.

19. The method of claim 17, wherein positioning the actuator at the predetermined position permits the latch to move between the locking configuration and the unlocking configuration through movement of the locking pin into the lock cylinder.

20. The method of claim 17, further comprising:
sensing a position of the locking pin using a first sensor;
sensing a position of the latch using a second sensor; and
sensing a position of the actuator using a third sensor.

* * * * *